(12) United States Patent
Poole

(10) Patent No.: US 7,614,038 B2
(45) Date of Patent: Nov. 3, 2009

(54) SYSTEMS AND METHODS FOR DETERMINING THE SOFTWARE COMPONENTS INCLUDED IN A VIEW OF A SOFTWARE DEVELOPMENT PROJECT AT A PARTICULAR TIME

(75) Inventor: Damon B. Poole, Lexington, MA (US)

(73) Assignee: Accurev, Inc., Lexington, MA (US)

( * ) Notice: Subject to any disclaimer, the term of this patent is extended or adjusted under 35 U.S.C. 154(b) by 845 days.

(21) Appl. No.: 10/894,964

(22) Filed: Jul. 19, 2004

(65) Prior Publication Data

US 2006/0015851 A1    Jan. 19, 2006

(51) Int. Cl.
*G06F 9/44* (2006.01)
*G06F 17/00* (2006.01)
*G06F 17/30* (2006.01)

(52) U.S. Cl. .................. 717/113; 717/102; 717/109; 717/121; 715/229; 707/9

(58) Field of Classification Search ................ None
See application file for complete search history.

(56) References Cited

U.S. PATENT DOCUMENTS

| | | | |
|---|---|---|---|
| 4,809,170 A | 2/1989 | Leblang et al. | |
| 5,649,200 A | 7/1997 | Leblang et al. | |
| 6,216,140 B1 | 4/2001 | Kramer | |
| 6,272,678 B1 * | 8/2001 | Imachi et al. | 717/122 |
| 6,487,713 B1 * | 11/2002 | Cohen et al. | 717/105 |
| 6,493,732 B2 * | 12/2002 | Aoyama et al. | 715/229 |
| 6,557,012 B1 | 4/2003 | Arun et al. | |
| 6,766,334 B1 * | 7/2004 | Kaler et al. | 707/203 |
| 6,978,281 B1 * | 12/2005 | Kruy et al. | 707/203 |
| 7,251,655 B2 * | 7/2007 | Kaler et al. | 707/9 |
| 7,289,973 B2 * | 10/2007 | Kiessig et al. | 707/1 |
| 2004/0056903 A1 * | 3/2004 | Sakai | 345/853 |
| 2004/0260693 A1 * | 12/2004 | Chen et al. | 707/5 |
| 2005/0114479 A1 * | 5/2005 | Watson-Luke | 709/220 |

OTHER PUBLICATIONS

Pending claims in co-pending U.S. Appl. No. 12/059,529, filed Mar. 31, 2008.

* cited by examiner

*Primary Examiner*—Tuan Q Dam
*Assistant Examiner*—Isaac T Tecklu
(74) *Attorney, Agent, or Firm*—Wolf, Greenfield & Sacks, P.C.

(57) ABSTRACT

Systems and methods for providing a user interface that enables a user, for example, a developer, to indicate whether to include a software component, for example, a file or directory, in a view of a version of a software development project. The user's indication may be recorded along with a time at which the indication was recorded or a transaction number representative of the time in which the indication was recorded. Systems and methods are provided for determining one or more software components of a software development project included within a view of a version of the software development project at a particular time, for example, some time in the past.

32 Claims, 25 Drawing Sheets

| Stream ID | EID | TX # | Active ? | Kind |
|---|---|---|---|---|
| 2 | 7 | 49 | 1 | Exclude |
| 2 | 6 | 50 | 1 | Exclude |
| 2 | 7 | 51 | 0 | None |
| 3 | 7 | 52 | 1 | IDO |
| 3 | 10 | 53 | 1 | Include |
| 3 | 6 | 54 | 1 | Include |

FIG. 9

Figure 10:
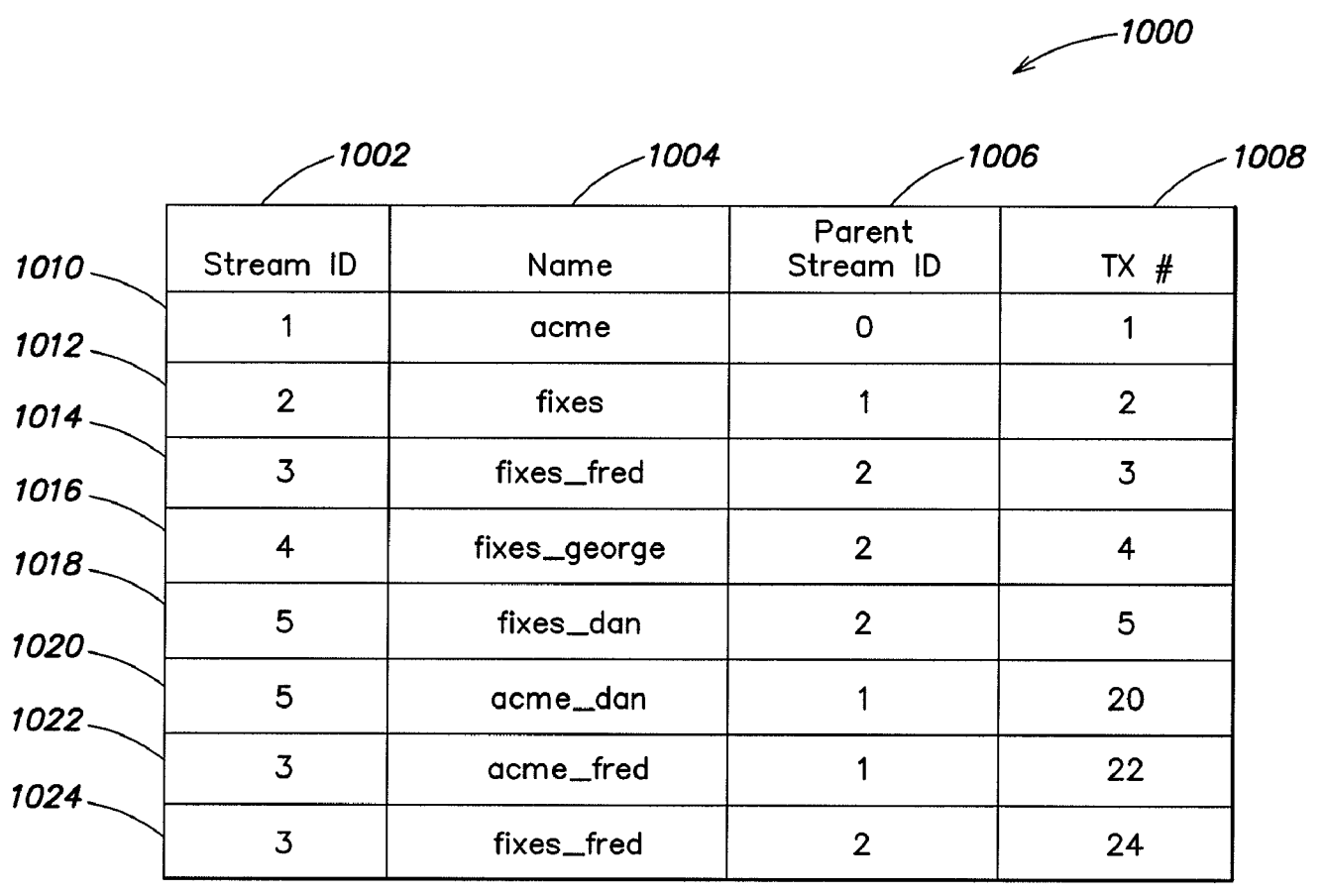

| Stream ID | Name | Parent Stream ID | TX # |
|---|---|---|---|
| 1 | acme | 0 | 1 |
| 2 | fixes | 1 | 2 |
| 3 | fixes_fred | 2 | 3 |
| 4 | fixes_george | 2 | 4 |
| 5 | fixes_dan | 2 | 5 |
| 5 | acme_dan | 1 | 20 |
| 3 | acme_fred | 1 | 22 |
| 3 | fixes_fred | 2 | 24 |

| Parent EID | Name | Stream ID | TX # | EID | Defunct? | DIR? | In-Progress? |
|---|---|---|---|---|---|---|---|
| 1 | GUI | 3 | 6 | 2 | 0 | 1 | 1 |
| 2 | screen.cc | 3 | 7 | 3 | 0 | 0 | 1 |
| 1 | sys.cc | 5 | 8 | 4 | 0 | 0 | 1 |
| 1 | sys.cc | 5 | 9 | 4 | 0 | 0 | 0 |
| 1 | sys.cc | 1 | 9 | 4 | 0 | 0 | 1 |
| 1 | sys.cc | 3 | 10 | 4 | 1 | 0 | 1 |
| 1 | sys.cc | 3 | 11 | 4 | 1 | 0 | 0 |
| 1 | sys.cc | 2 | 11 | 4 | 0 | 0 | 1 |
| 2 | Menu Bar | 1 | 30 | 5 | 0 | 1 | 1 |
| 5 | Edit | 1 | 32 | 5 | 0 | 1 | 1 |
| 5 | Tools | 1 | 34 | 5 | 0 | 0 | 1 |
| 6 | delete.cc | 1 | 36 | 5 | 0 | 0 | 1 |
| 7 | foo.cc | 1 | 38 | 5 | 0 | 0 | 1 |
| 7 | bar.cc | 1 | 40 | 5 | 0 | 0 | 1 |

| Parent EID | Name | Stream ID | TX # | EID | Defunct? | Dir? | In-Progress |
|---|---|---|---|---|---|---|---|
| 1 | GUI | 3 | 6 | 2 | 0 | 1 | 1 |
| 1 | sys.cc | 3 | 11 | 4 | 1 | 0 | 1 |
| 1 | sys.cc | 3 | 10 | 4 | 1 | 0 | 0 |
| 1 | sys.cc | 2 | 11 | 4 | 1 | 0 | 1 |
| 1 | sys.cc | 1 | 9 | 4 | 0 | 0 | 1 |

FIG. 16

SYSTEMS AND METHODS FOR DETERMINING THE SOFTWARE COMPONENTS INCLUDED IN A VIEW OF A SOFTWARE DEVELOPMENT PROJECT AT A PARTICULAR TIME

RELATED APPLICATIONS

Commonly-owned U.S. Pat. No. 7,437,722, titled DETERMINING WHICH SOFTWARE COMPONENT VERSIONS OF AN ISSUE RESOLUTION ARE INCLUDED IN A VERSION OF A SOFTWARE DEVELOPMENT PROJECT AT A PARTICULAR TIME by Damon B. Poole, filed on even date herewith and issued on Oct. 14, 2008 (hereinafter the Poole application) is hereby incorporated by reference in its entirety.

BACKGROUND

Developing software applications and products often requires the coordinated efforts of many developers (e.g., software programmers). This coordinated effort is referred to herein as a "software development effort" or "development effort," and the body of work (e.g., one or more software applications and/or products) being developed by the effort is referred to as a "software development project", "development project" or "project". At any given time, as part of a software development effort, multiple developers may be working on different components of a software development project and/or different versions of these components (e.g., for different users or situations). Managing the concurrent development of these different software components and versions is commonly referred to as configuration management (CM). CM software applications (i.e., programs) assist developers and project managers in the management of a software development project, including maintaining coherency between different components and versions.

A software development project typically includes a plurality of software components (e.g., files and directories). Some CM applications provide each developer a "workspace" (defined below) in which the developer can add, modify and delete components of the development project pertinent to the developer's objective. Such a workspace may provide the developer a visual presentation of the software project, referred to herein as a "view" of the project. A view can be considered a developer's window into the software project. Some CM applications are limited to always providing a developer a view of the complete set of software components included in a development project. Other CM applications enable a user to selectively view less than all of the components of the software project so that the developer can see relevant components and not be distracted by irrelevant components. For example, some known applications enable a user to specify rules indicating whether to include/exclude a specific software component in/from a particular developer's view of the project. For example, a rule may specify to "include" a file in a developer's view or to "exclude" a directory from a developer's view. Such rules are referred to herein as "include/exclude rules" or "I/E rules."

As the number of software components of a project grows, a developer's view becomes more "crowded," and often more time-consuming and difficult to navigate. Thus, it may be desirable for a developer to exclude certain software components from his/her view, for example, components on which the developer is not working. Limiting the number of software components provides a simpler view of the project to the developer and allows the developer to concentrate (visually and mentally) on only the software components with which he/she is concerned. Further, such a simplified view makes it easier for the developer to navigate the view.

Known CM applications that provide the ability to specify whether to include a software component in a developer's view are limited to making such a specification only for the current time. For example, such a CM application may store I/E rules and information related thereto in a simple text file. Such CM applications may allow a developer's view to be altered by editing the text file to reflect new rules or information related thereto. However, after this alteration is made, the CM application does not maintain any information regarding the parameters of the prior view, i.e., the software components that previously were included or excluded from the developer's view. In other words, known CM applications do not maintain a history of information pertaining to I/E rules. Thus, after a developer's view has been changed, there is no way to determine the developer's previous view in an automated fashion. To make such a determination, one must resort to backed-up data (e.g., tape or disk backup)—if it even exists.

Resorting to backed-up data is not only time-consuming and inconvenient, but is also limited by the frequency at which the data is backed up. For example, if data is only backed up daily, then any modifications made between backups over the course of a day are lost.

Another drawback to known CM applications is that I/E rules can only be specified on a per-developer basis. Thus, if it is desired to exclude the same software component from the respective views of several developers, a separate I/E rule must be specified for each developer's view. For example, a team of developers may be working on a portion of a project that does not require them to work on any files within a particular directory. Thus, none of the members of the team need to see the directory in his/her respective view and neither they nor their supervisor desire that they see that directory. To exclude the directory from the views of all of the team members, known CM applications require a separate I/E rule to be specified for each developer's view. It is time-consuming to create such rules and time-consuming to change them. Also, there is no simple way for a supervisor to confirm compliances.

SUMMARY

In an embodiment of the invention, a method is provided for use in conjunction with a configuration management software application to manage a software development project. The software development project is represented by a hierarchy of versions, and each version comprises a set of software components. Software components included in a first view of a first version of the software development project at a first time are determined, where the first view is provided by the configuration management software application. It is determined whether a first software component is included in the first view of the first version at the first time by accessing a data structure that represents a history of views of versions of the software development project included in the hierarchy. If it is determined that the first software component was included in the first view at the first time, the first software component is displayed in the first view of the first version.

In another embodiment of the invention, a computer-readable medium is provided that stores computer-readable signals defining instructions that, as a result of being executed by a computer, instruct the computer to perform the method described in the preceding paragraph.

In another embodiment of the invention, a computer-readable medium is provided, having stored thereon a plurality of computer-readable signals defining a data structure. The data structure corresponds to a software project represented by a hierarchy of versions of a software project. Each version comprises a set of software components and corresponds to one or more users of a software configuration management application. The application is operable to provide a view of a first version of the software development project for the one or more users. The data structure comprises a first entry specifying a first time and specifying whether a first software component of the first version was included in the view of the first version at the first time.

In yet another embodiment, a system is provided for use in conjunction with a configuration management software application to manage a software development project. The project is represented by a hierarchy of versions of the software development project, and each version comprises a set of software components. The system is for determining software components included in a first view of a first version of the software development project at a first time, the first view being provided by the configuration management software application. The system comprises a stream view engine to determine whether a first software component is included in the first view of the first version at the first time by accessing a data structure that represents a history of views of versions of the software development project included in the hierarchy. The system also comprises a user interface to control a display of the first software component in the first view of the first version if it is determined that the first software component was included in the first view at the first time.

In another embodiment, a system is provided for use in conjunction with a configuration management software application to manage a software development project. The project is represented by a hierarchy of versions of the software development project, and each version comprises a set of software components. The system is for determining software components included in a first view of a first version of the software development project at a first time, the first view being provided by the configuration management software application. The system comprises means for determining whether a first software component is included in the first view of the first version at the first time by accessing a data structure that represents a history of views of versions of the software development project included in the hierarchy. The system also comprises a user interface to control a display of the first software component in the first view of the first version if it is determined that the first software component was included in the first view at the first time.

In another embodiment, a method is provided for use in conjunction with a configuration management software application to manage a software development project. The project is represented by a hierarchy of versions of the software development project, and each version comprises a set of software components. Instruction indicating whether to include a first software component in a view of a first version of the software development project are recorded, the view being provided by the configuration management software application. The instruction is received at a first time. An entry is recorded in a data structure that represents a history of views of versions of the software development project included in the hierarchy. The entry specifies the instruction and the first time at which the instruction was received.

In another embodiment of the invention, a computer-readable medium is provided that stores computer-readable signals defining instructions that, as a result of being executed by a computer, instruct the computer to perform the method described in the preceding paragraph.

In yet another embodiment, a system is provided for use in conjunction with a configuration management software application to manage a software development project. The project is represented by a hierarchy of versions of the software development project, and each version comprises a set of software components. The system is for recording an instruction indicating whether to include a first software component in a view of a first version of the software development project, the view being provided by the configuration management software application. The system comprises a user interface to receive the instruction at a first time. The system also comprises a stream view engine to record an entry in a data structure that represents a history of views of versions of the software development project included in the hierarchy. The entry specifies the instruction and the first time at which the instruction was received.

In another embodiment, a system is provided for use in conjunction with a configuration management software application to manage a software development project. The project is represented by a hierarchy of versions of the software development project, and each version comprises a set of software components. The system is for recording an instruction indicating whether to include a first software component in a view of a first version of the software development project, the view being provided by the configuration management software application. The system comprises a user interface to receive the instruction at a first time. The system also comprises means for recording an entry in a data structure that represents a history of views of versions of the software development project included in the hierarchy. The entry specifies the instruction and the first time at which the instruction was received.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 9 is a block diagram illustrating an example of a historical Include/Exclude data structure;

FIG. 10 is a block diagram illustrating an example of a historical stream hierarchy data structure;

FIG. 11 is a block diagram illustrating an example of a historical element location data structure;

FIG. 16 illustrates an example of a data structure including sorted element location information;

DEFINITIONS

Figure 1:
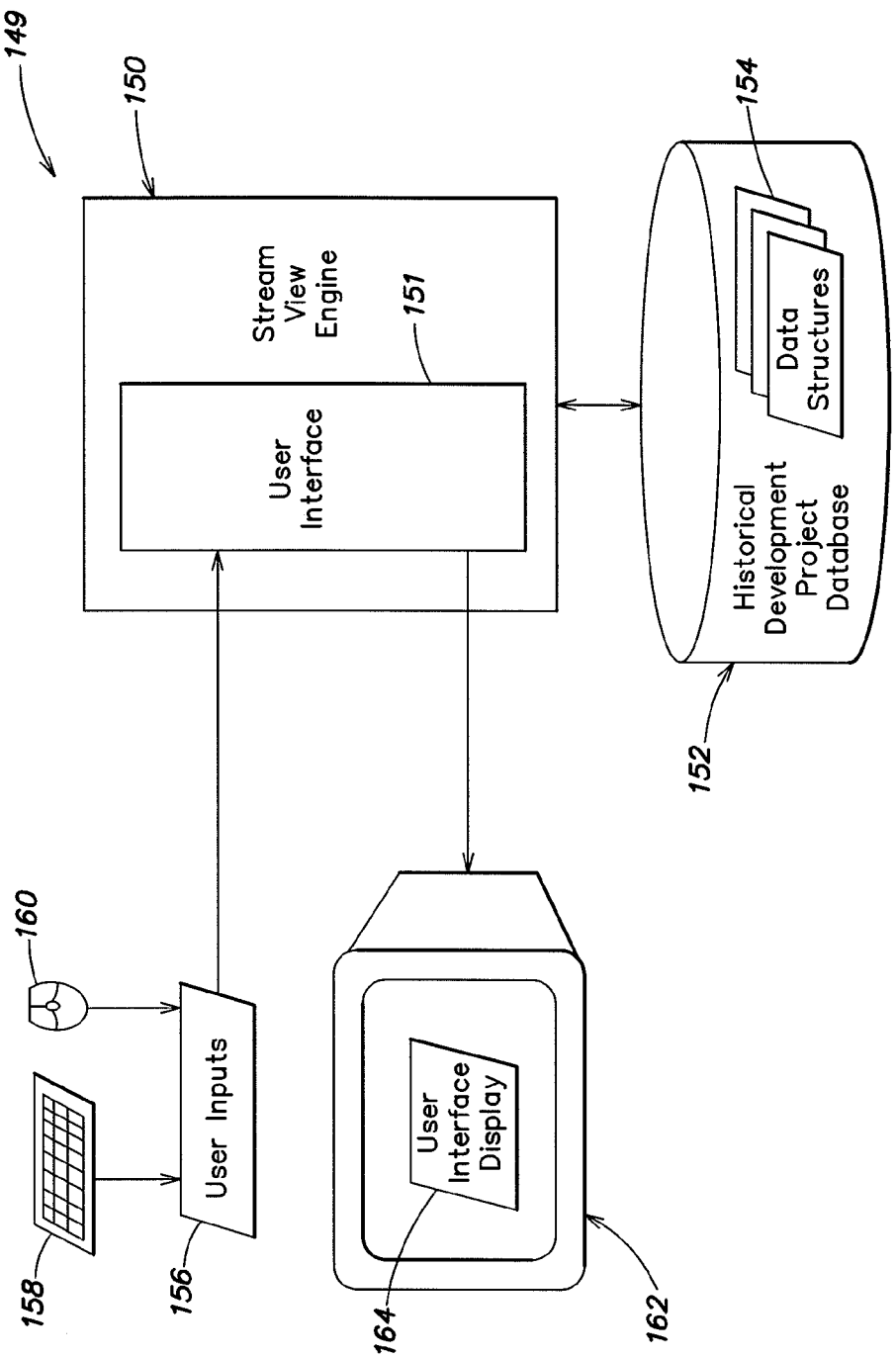
FIG. 1 is a block diagram illustrating an example of a system for specifying I/E rules for a view of a stream and for determining the software components included in a view of a stream at a particular time.

The following terms have the following meanings in this application. All definitions, as defined and used herein, should be understood to control over dictionary definitions, definitions in documents incorporated by reference, and/or ordinary meanings of the defined terms.

As used herein, a "plurality" means two or more.

As used herein, a "software component" is a component of a larger software entity, for example, an application (program), a development project, a product, another software component, another type of software entity or any combination thereof. A software component may be, for example, a program, a file, a directory, a directory element, an object, a record, a table, another type of software component or any combination thereof. As used herein, a "directory element" is a directory or a file.

As used herein, a "file hierarchy" or is a logical hierarchy defining an organization of files. FIG. 1A, described in more detail below, illustrates an example of a directory hierarchy. A file hierarchy includes at least a "root directory" at a highest level of the hierarchy. The root directory may include, at a second level in the hierarchy, one or more directory elements. As used herein, a "directory element" is an element of a directory, and may be any of a variety of types of software components (e.g., a file or directory). As used herein, a "directory," including the root directory and any of its sub-directories, is a directory element (e.g., of a file hierarchy) that includes one or more other directory elements, e.g., files and/or directories. As used herein, a "child element" or "child" of a directory (e.g., the root directory or any of its sub-directories) is an element included within the directory at a level immediately below the level of the hierarchy, whereas any element included within the directory, regardless of level, is referred to as a "descendant element" or "descendant" of the directory. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computational and storage capabilities of the system on which the file hierarchy is implemented.

As used herein, a "version" of a software development project (or other software entity) is a set of software components of the project, and for each software component, a version thereof. It should be appreciated that different versions of a software project (or other type of software entity) may have the same content (e.g., may include a same set of software component versions) or different content. A developer's workspace may be considered a version of the project. As used herein, a "set" of items may include one or more of such items. For example, a set of software components may include one or more software components.

As used herein, a "stream" is a software abstraction representing a version of a software development project (or other type of software entity) and including a set of software components.

Figure 2:
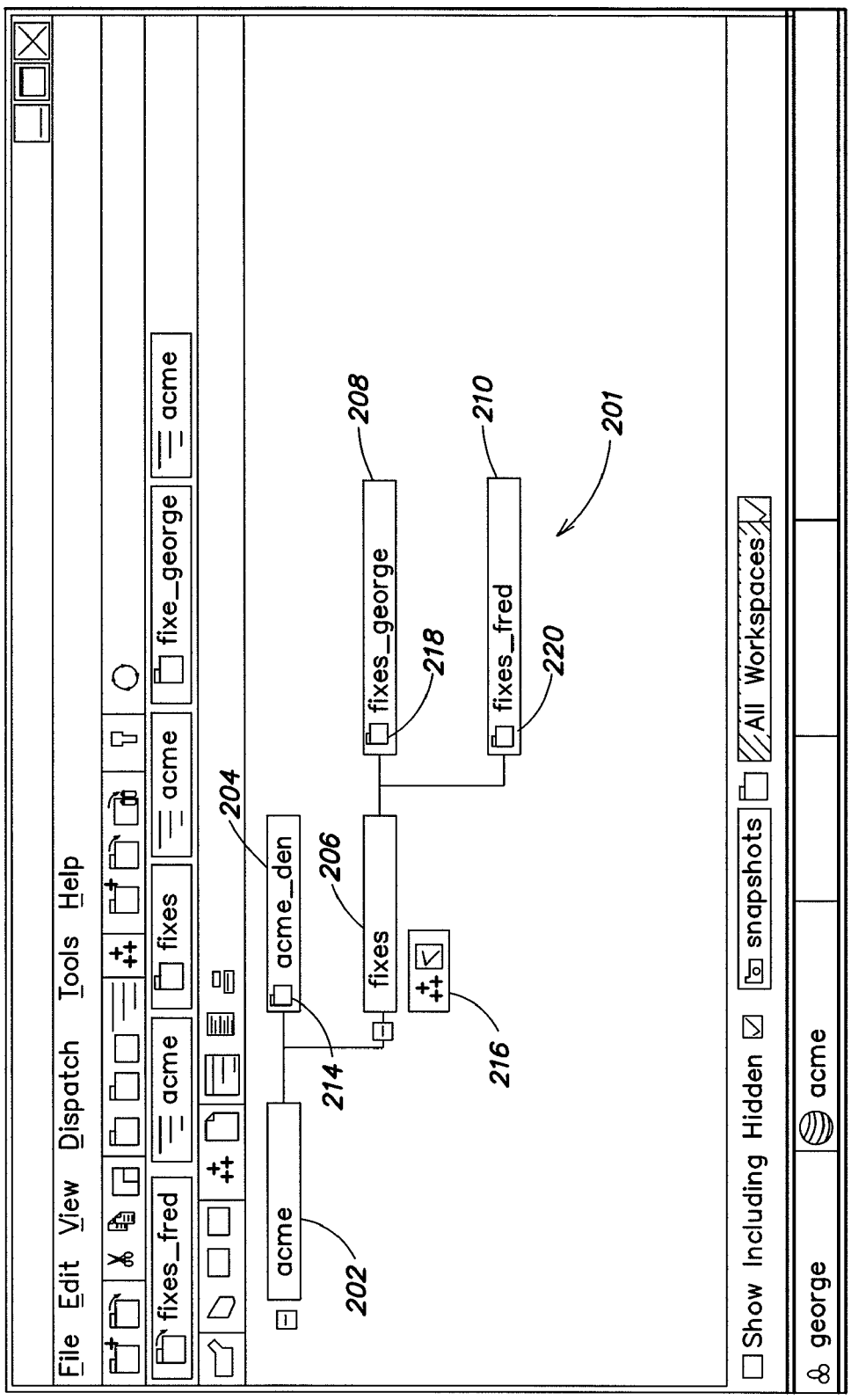
FIG. 2 is a screen shot illustrating an example of a GUI display that includes a representation of a stream hierarchy.

As will be described in more detail below, a stream may be part of a stream hierarchy. As used herein, a "stream hierarchy" is a logical hierarchy of streams defining relationships between streams. FIG. 2, described in more detail below, illustrates an example of a stream hierarchy. A stream hierarchy includes at least one stream, the "source stream", which is at a highest level of the hierarchy, and is the stream from which the other streams of the hierarchy are ultimately derived. A stream having one or more children is a "parent stream" or "parent" of each child stream. A parent stream, including the source stream, may have one or more "children" or "child streams," that each inherit one or more properties of the parent stream and its ancestors. For example, as will be described in more detail below, a child stream may be configured to inherit one or more I/E rules defined for its parent. Each child stream includes at least a subset of the directory elements included in its parent stream. As will be explained in more detail below, although a child stream typically is derived directly (i.e., created from) its parent stream, this is not always the case, as a stream's relative position within the hierarchy may change over time. As a result, a child stream may have a parent from which the child was not derived.

As used herein, a "workspace" is a type of stream in which a user (e.g., a developer) can make changes to the content of a software entity (e.g., a software development project). Workspaces may be limited to being at the bottom of a stream hierarchy and any stream ancestry chains (described below) determined for the stream hierarchy. In some embodiments, workspaces are configured such that they cannot have child streams; i.e., so that they cannot be a parent stream. Thus, in some embodiments, as will be described in more detail below, changes to a software entity are made only in workspaces, and then propagated to other streams.

As used herein, an "include/exclude rule" or "I/E rule" is a rule specifying whether to include or exclude a directory element from a view of a stream. In some embodiments, if the directory element is a directory, an I/E rule may specify whether to include or exclude one or more of its child elements from the view. Any of a variety of types of I/E rules may be used, including, but not limited to: an include rule, an include directory only (IDO) rule, and an exclude rule.

As used herein, an "exclude rule" is an I/E rule that, when defined for a directory element of a stream, specifies that the directory element and its child elements, if any (i.e., if it is a directory), are excluded from a view of the stream.

As used herein, an "include rule" is an I/E rule that, when defined for a directory element of a stream, specifies that the directory element is included in a view of the stream. An include rule also specifies that each of the directory element's child elements, if any (i.e., if it is a directory), are included in the view, unless an exclude rule has been defined for the child element. In other words, each child element of an element for which an include rule has been specified are included in the view by default, unless an exclude has been specified for the child element.

As used herein, an "include directory only rule" or "IDO rule" is an I/E rule that can be defined for directories only, not for files. When defined for a directory of a stream, an IDO rule specifies that the directory is included in a view of the stream; however, each of the directory's child elements, if any, are excluded from the view, unless an include rule has been defined for the child element. In other words, each child element of a directory for which an IDO rule has been specified are excluded from the view by default, unless an include rule or IDO rule (for directories only) has been specified for the child element.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

As used herein, a "visual user interface" is the portion of the user interface that defines how information is visually presented (i.e., displayed) to the user, and defines how the user can navigate the visual presentation (i.e., display) of information and input information in the context of the visual presentation. During execution of the application, the visual interface controls the visual presentation of information and enables the user to navigate the visual presentation and enter information in the context of the visual presentation. Types of visual user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces.

As used herein, the visual presentation of information presented by a user interface, visual user interface or GUI is referred to as a "user interface display", "visual user interface display" or a "GUI display", respectively.

As used herein, an "application programming interface" or "API" is a set of one or more computer-readable instructions that provide access to one or more other sets of computer-readable instructions that define functions, so that such functions can be configured to be executed on a computer in conjunction with an application program. An API may be considered the "glue" between application programs and a particular computer environment or platform (e.g., any of those discussed below) and may enable a programmer to program applications to run on one or more particular computer platforms or in one or more particular computer environments.

As used herein, a "data structure" is an ordered arrangement of data defined by computer-readable signals recorded by a program for use by that or another program(s). These signals may be read by a computer system, stored on a medium associated with a computer system (e.g., in a memory, on a disk, etc.) and may be transmitted to one or more other computer systems over one or more communications media such as, for example, one or more segments of a network.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

DETAILED DESCRIPTION

Described herein are systems and methods for providing a user interface that enables a user (e.g., developer) to indicate (e.g., specify) whether to include a software component in a view of a stream, and for recording the user's indication and a time, or a value representative of the time, at which the indication was recorded. The representative time may be, for example, a standard time or a code corresponding to a standard time. In some embodiments, the user indicates whether to include the software component in the view of the stream by specifying an I/E rule for the components, in which case the I/E rule and the value representative of time may be recorded.

A user interface may be provided that includes a visual representation of a stream hierarchy, including a visual indication of whether one or more streams of the hierarchy are "in progress." Such a visual indication enables a user to visually determine, relatively simply, whether any streams have changes that have not been propagated to their respective parent streams. Thus, a user can visually determine whether there are any differences between the contents of any of the streams.

As will be explained in more detail below, in some embodiments, an I/E rule specified for an element of a stream may be inherited by the stream's descendants, such that a single I/E rule may be applied to a plurality of developer's streams (e.g., workspaces). Thus, an I/E rule may be specified only once (e.g., by a supervisor) and applied to a plurality of users. Conversely, for each descendant stream, an I/E rule may be specified for the same element that overrides the rule specified in the ancestor stream and negates the inheritance. For example, an include rule may be specified for an element in a stream, which is overridden by an exclude rule specified for the same element in a descendant stream. That is, in at least some embodiments, if a rule is provided for a descendant stream, that rule automatically prevails over a conflicting rule that is inheritable. In other embodiments, the descendant stream rule may be made to override or not override an inheritable rule, at a user's selection.

A data structure may be provided that maintains a history of one or more views (e.g., of a software development project). Such a data structure may include one or more entries, where each entry corresponds to a time, for example, a past time, and specifies whether to include an element in a stream at the time. For example, such entry may specify an I/E rule for the element in the stream at the time. From the entries of such a data structure, the software components (e.g., directory elements) included in a view of a stream at a past time may be determined.

Described herein are systems and methods for determining one or more software components of a software development project (or other software entity) included within a view of a stream at a particular time (e.g., a time selected by a user), for example, sometime in the past. Such a determination may be made in response to a query entered by a user (e.g., a developer) or in response to a user action, for example, a user selecting (e.g., from a user interface display) a stream or a software component from within a stream. The determination may include accessing a data structure that maintains a history of views of the software development project, for example, a data structure similar to or the same as the one described above. Entries may be selected from the data structure, for example, entries corresponding to any time up until and including the particular time (e.g., selected by a user), and that specify an I/E rule for software components that are or were included in the stream or one of its ancestors. The entries may be sorted by software component, stream and/or time. For each software component, from the entries corresponding to the software component, it may be determined whether the software component was included in the stream at the particular time, and a view corresponding to the view at the particular time may be recreated.

Although several embodiments discussed herein are described primarily in reference to files and directories, it should be appreciated that the invention is not limited thereto. Embodiments of the invention may be applied to or implemented using any of a variety of types of software components such as, for example, any of those described above. Further, although several embodiments described herein are described primarily in reference to a software development project, it should be appreciated that the invention is not limited thereto. Embodiments of the invention may be applied to or implemented using any of a variety of types of software entities such as, for example, any of those described above.

Although some embodiments discussed herein are discussed primarily in relation to a plurality of streams within a stream hierarchy, the invention is not so limited. The methods and systems described herein may be applied to situations in which only a single stream (e.g., a source stream, described below) is present.

Further, although some embodiments discussed herein are discussed primarily in relation to streams, the invention is not so limited. The methods and systems described herein may be applied to any type of version of a software development project or other entity.

In some embodiments of the invention, every transaction affecting a software entity (e.g., a software development project) is recorded, for example, in a database. A transactions may include: a creation, modification or deletion of any of a software entity, a software component or a stream; a promotion of a software component from one stream to another, an updating of a stream; a change of location of a stream within a stream hierarchy; a change of location of a software component within a file hierarchy; the creation, modification or deletion of an issue and/or an issue resolution; the creation, modification or deletion of any information (e.g., meta data) relating to any of the foregoing; any other type of transaction; and any combination of the foregoing.

Each transaction may be assigned a unique transaction identifier, for example a number. Such an identifier may be referred to herein as a "transaction number." A time (e.g., a standard time) at which the transaction occurred may be associated with each transaction, such that each transaction corresponds to a time. The association of a transaction and a time may be stored as an entry in a data structure. Such a data structure may be referred to herein as "transaction data structure," and may include a plurality of entries, each entry representing a transaction and including a transaction number, a time and possibly other information (e.g., a description of the transaction).

Each transaction may result in a new entry being created in one or more other data structures as well, for example, data structures 900, 1000 and 1000 described below in more detail. Each new entry may include the transaction number associated with the transaction. The transaction data structure and the other data structures together may form a historical project development database, from which the state of various properties (e.g., content and other parameters) of a development project at any time during the life of the project may be determined and recreated. Specific examples of this ability to determine and recreate a past state of one or more parameters of a project is discussed in more detail below.

At least some of the embodiments of the invention may be implemented using CM products available from AccuRev, Inc. of Lexington, Mass. such as, for example, AccuRev 3.5.

The function and advantage of these and other embodiments of the present invention will be more fully understood from the examples described below. The following examples are intended to facilitate an understanding of the invention and to illustrate the benefits of the present invention, but do not exemplify the full scope of the invention.

EXAMPLES

Figure 1A:
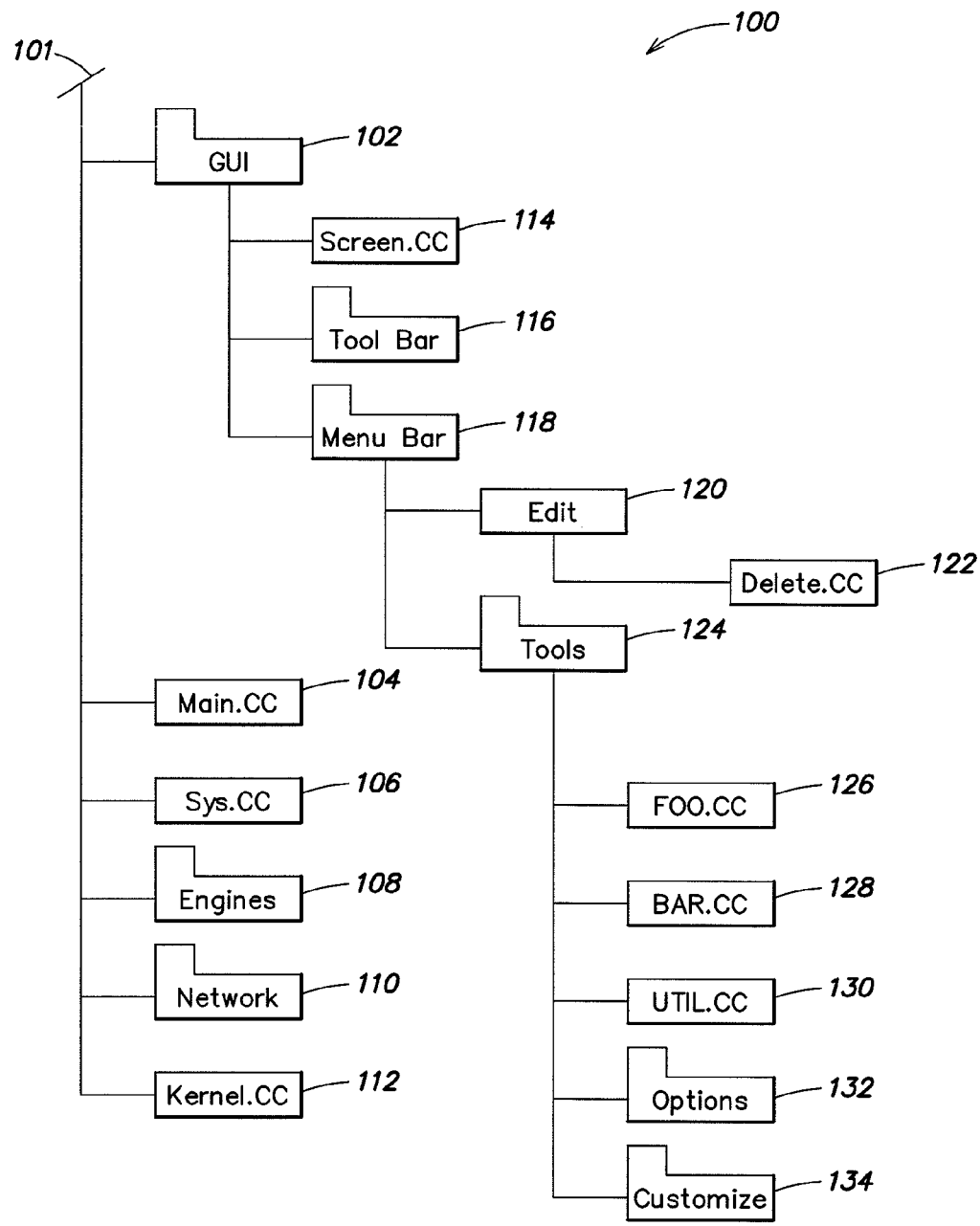
FIG. 1A is a diagram illustrating an example of a file hierarchy for use herein.

FIG. 1 is a block diagram illustrating an example of a system 149 for specifying I/E rules for a view of a stream and for determining the software components included in a view of a stream at a particular time. System 149 may include any of a stream view engine 150 and a historical development project database 152, which may include one more data structures 154. The stream view engine 150 may be configured to receive one or more user inputs 156, for example, user inputs specifying one or more of any of the following: streams, software components, I/E rules, transaction numbers, time, other inputs, and any combination of the foregoing. These inputs may be received from any of a plurality of user input devices, for example, keyboard 158, mouse 160, a touch screen, a track ball, a microphone, or any other type of input device.

The stream view engine 150 may be configured to create one or more I/E rules based on the inputs 156, and to store information relating thereto in one or more of the data structures 154 of database 152, for example, as described in more detail below. Each I/E rule may be stored along with a transaction number so that a history of I/E rules may be maintained. Further, engine 150 may be configured to access one or more of the data structures 154 of database 152, based on inputs 156, to determine a view of the contents of a view at a present or past time. The engine may include a user interface configured to control a user output device (e.g., monitor 162) to display a user interface display 164 that shows the contents of the view, for example, as is described in more detail below.

Figure 20:
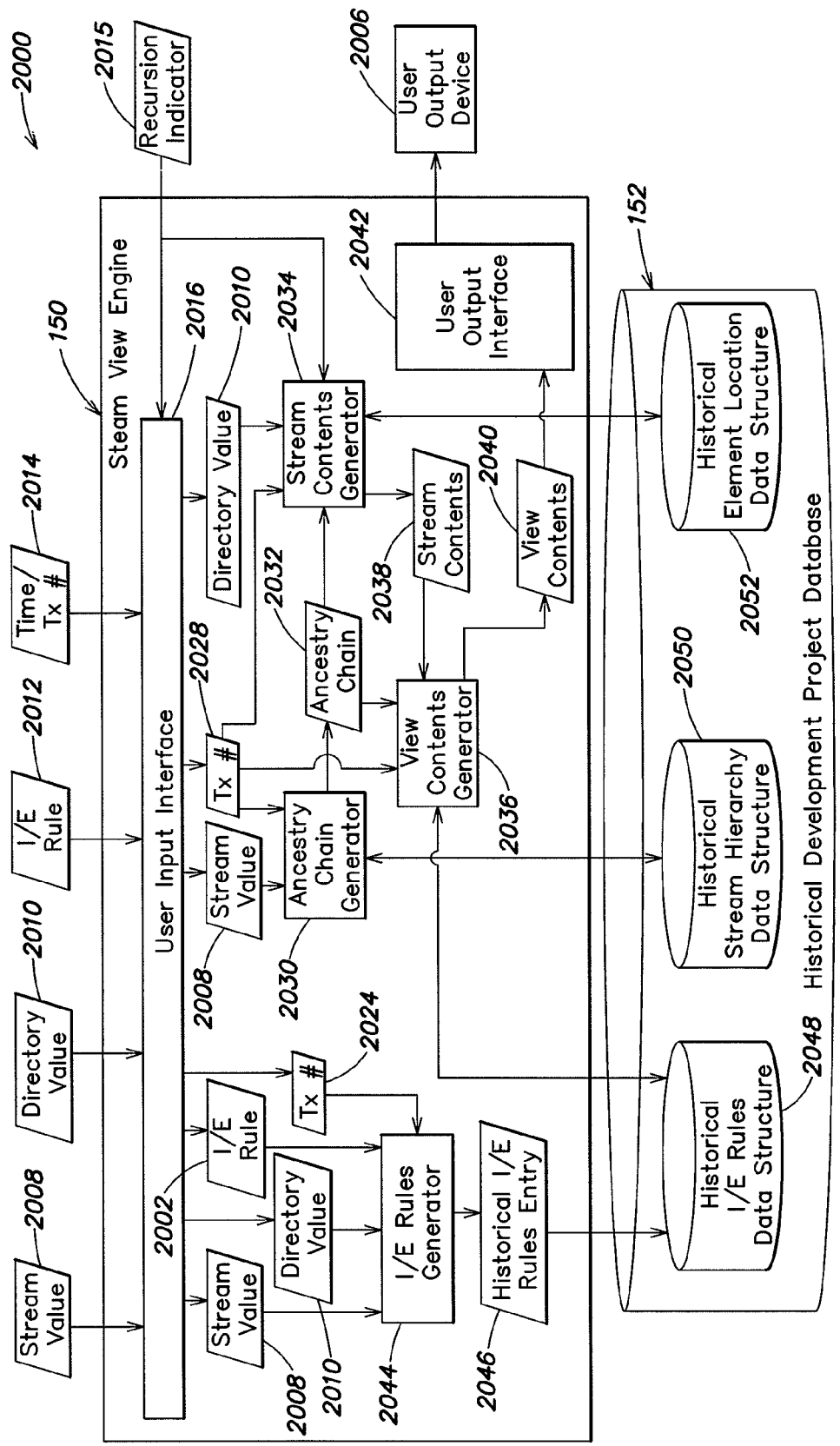
FIG. 20 is a block diagram illustrating an example of a system for specifying I/E rules for a view and for determining the software components included in a view of a stream at a particular time.
Figure 21:
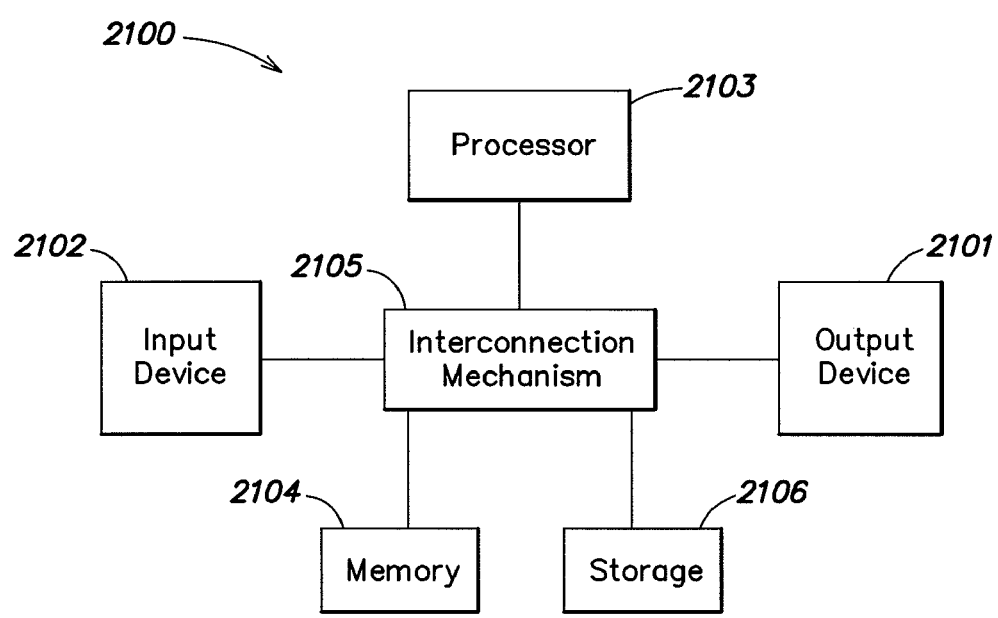
FIG. 21 is a block diagram of a computer system on which one or more embodiments of the invention may be implemented.
Figure 22:
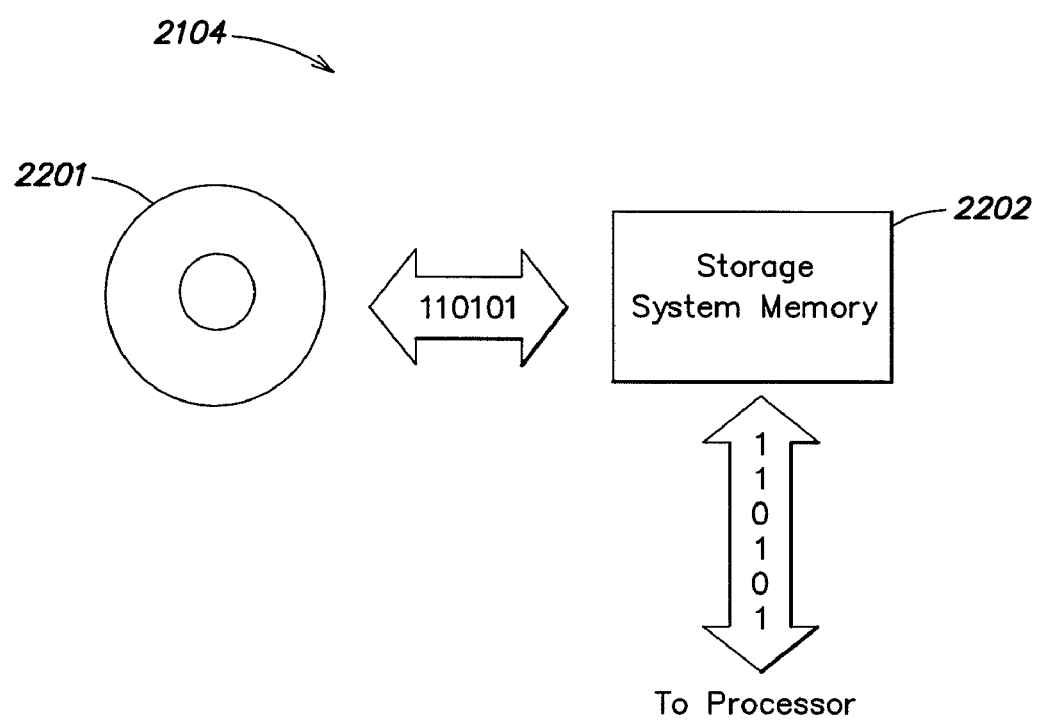
FIG. 22 is a block diagram illustrating an example of a memory system for the computer system of FIG. 21.

The following description begins by discussing file hierarchies and stream hierarchies (FIGS. 1A and 2) to provide context for the remaining description. This discussion is followed by an example of a method of entering I/E rules for streams (FIG. 3) and descriptions of examples of user interfaces that may be provided to assist a user in viewing streams and entering I/E rules for streams (FIGS. 4-8). After the discussion of user interfaces, historical data structures that may be used in various embodiments of the invention are described (FIGS. 9-11), followed by a discussion of methods that may be employed (e.g., by a stream view engine) to determine the contents of a view of a stream at a particular time (e.g., a time in the past) (FIGS. 12-19). The description concludes with a more detailed description of a system for entering I/E rules for a stream and for determining the contents of a view of a stream at a queried time (e.g., a time in the past) (FIGS. 20-22).

FIG. 1A is a diagram illustrating an example of a file hierarchy 100. Directory 100 includes root directory 101. Root directory 101 includes directories 102, 108 and 110 and files 104, 106 and 112. Directory 102 includes directories 116 and 118, and file 114. Directory 118 includes directories 120 and 124, and directory 120 includes file 122. Directory 124 includes directory 132 and files 126, 128, 130 and 134.

File hierarchy 100, and the directory elements included therein, will be referred to throughout the remainder of the detailed description, as will be the stream hierarchy 201 illustrated in FIG. 2, which will now be described.

FIG. 2 is an example of a screen shot illustrating an example of a GUI display 200 that includes a stream hierarchy 201. Stream hierarchy 201 includes streams 202, 204, 206, 208 and 210. Stream 202 is the source stream (defined above) of hierarchy 201 from which the remaining streams are derived, and streams 204, 208 and 210 are workspaces (defined above). In some embodiments, any changes to a development project (e.g., adding, modifying and removing files or directories) are initiated within a workspace.

It should be appreciated that a user may make changes to software components outside of the scope of the project itself. For example, some CM applications, such as those available from AccuRev, Inc., enable a user to create, change and delete software components (which may have originated within the project) on the user's computer, for example, using any of a variety of editors or software tools. However, the user has the option of specifying whether these changes are recorded as part of the project. If not recorded, the changes do not affect the software project. The systems and methods described herein are concerned with changes to a software project, not changes made by a user that are not recorded as part of the project. Accordingly, for the remainder of the detailed description, when software components are described as being modified, changed, added or removed from a workspace, it is meant that these transactions have been recorded as part of the workspace, unless otherwise specified.

If changes made within a workspace are to be made part of other versions (e.g., streams) of the project, the elements affected by the changes may be propagated up through the hierarchy to the source stream (e.g., source stream 202). As used herein, to "promote" means to propagate up a hierarchy, whereas "update" means to propagate down through a hierarchy. For example, a file added to workspace 210 then may be promoted to workspace 206, from which the file then may be promoted to source stream 202. Stream 204 then may be updated with the added file.

GUI display 200 may include visual indicators to assist a user in determining whether a stream is a workspace. For example, GUI display 200 provides workspace indicators 214, 218 and 220 to indicate that streams 204, 208 and 210, respectively, are workspaces. Other indicators may be used.

GUI display 200 also may include visual indicators to indicate when a stream is in progress. As will be described in more detail below, a stream is "in progress" when the stream includes one or more changes to a project (e.g., a new element, a modified element or a defunct element) that have not been promoted to its parent stream. As used herein, an element that is "defunct" within a stream (e.g., a workspace) is element that has been removed from the stream. If a change in a first stream has not been promoted to the first stream's parent stream, then the first stream and its descendants include a change to the project that is not included in the other remaining streams. Accordingly, the contents of the first stream and its descendant streams are different than the contents of the remaining streams, such that the visual indicator indicates the existence of this difference.

GUI display 200 may include visual indicator 216 to indicate that stream 206 is in progress. For example, a directory may have been removed from workspace 210 and then promoted to stream 206, but not promoted (not yet at least) from stream 206 to source stream 202. Accordingly, visual indicator 216 indicates that stream 206 and its descendants 208 and 210 have different content than the remaining streams 202 and 204. This condition will remain until the changes are promoted from stream 206 to parent stream 202. Before the changes were promoted from workspace 210 to stream 206, a visual indicator may have been included in GUI display 200 to indicate that workspace 210 was in progress. Such a visual indicator may have been a same or different visual indicator than the visual indicator 216. It should be appreciated that such a visual indicator may be any kind of visual indicator and is not limited to the visual indicator 216 illustrated in FIG. 2.

Such an indicator may be beneficial for several reasons. For example, a user can determine from a glance at GUI display whether a particular stream has changes that have not been promoted. This quick look saves the user the time that typically would be required to open a stream and examine its contents. Another benefit is that a user (e.g., a supervisor or project team leader) can visually determine the progress (to an extent) of an entire project from a brief inspection of GUI display 200. Moreover, as a user becomes more familiar with GUI display 200, the information gleaned therefrom may become more intuitive.

As described above, each stream in a stream hierarchy (e.g., hierarchy 201) may inherit one or more properties from its ancestor streams. For example, unless an element is currently in progress within a stream (e.g., a workspace), the determination of whether or not the element is included within the stream may be determined based on ancestor streams, as will be described in more detail below. Further, as will be described in more detail below, a stream may inherent the I/E rules of its ancestors.

In some embodiments, a stream's position within the hierarchy may change over time. For example, a stream's parent stream, and thus its ancestors, may be different than the parent stream and ancestors from which the stream was originally derived. For example, workspace 204 may originally have been created as a child of stream 206, and then moved up in the hierarchy to be a child of source stream 202. Accordingly, although element 204 originally inherited properties from stream 206 from which it was derived, element 204 no longer inherits properties from stream 206, but now inherits properties only from source stream 202. In another example, element 204 may initially have been a child of source stream 202 and then moved to be a child of stream 206.

In some embodiments, a user interface (e.g., the GUI that provides GUI display 200) may be provided that enables a user to select a stream (e.g., any of streams 202-210). The user may be enabled to select a stream using any of a variety of types of input devices, for example, any of those described herein. The GUI preferably enables the user to move the location of a stream within a hierarchy such as, for example, by clicking and dragging a stream from one location to another on the GUI display 200. Further, such a GUI may enable the user to double click on a stream or otherwise select a stream, resulting in the user being presented with a view of the stream, through which the user may modify the stream and/or modify (e.g., add, change or clear) I/E rules for the stream, as is described in more detail below in relation to FIGS. 4-9.

Figure 3:
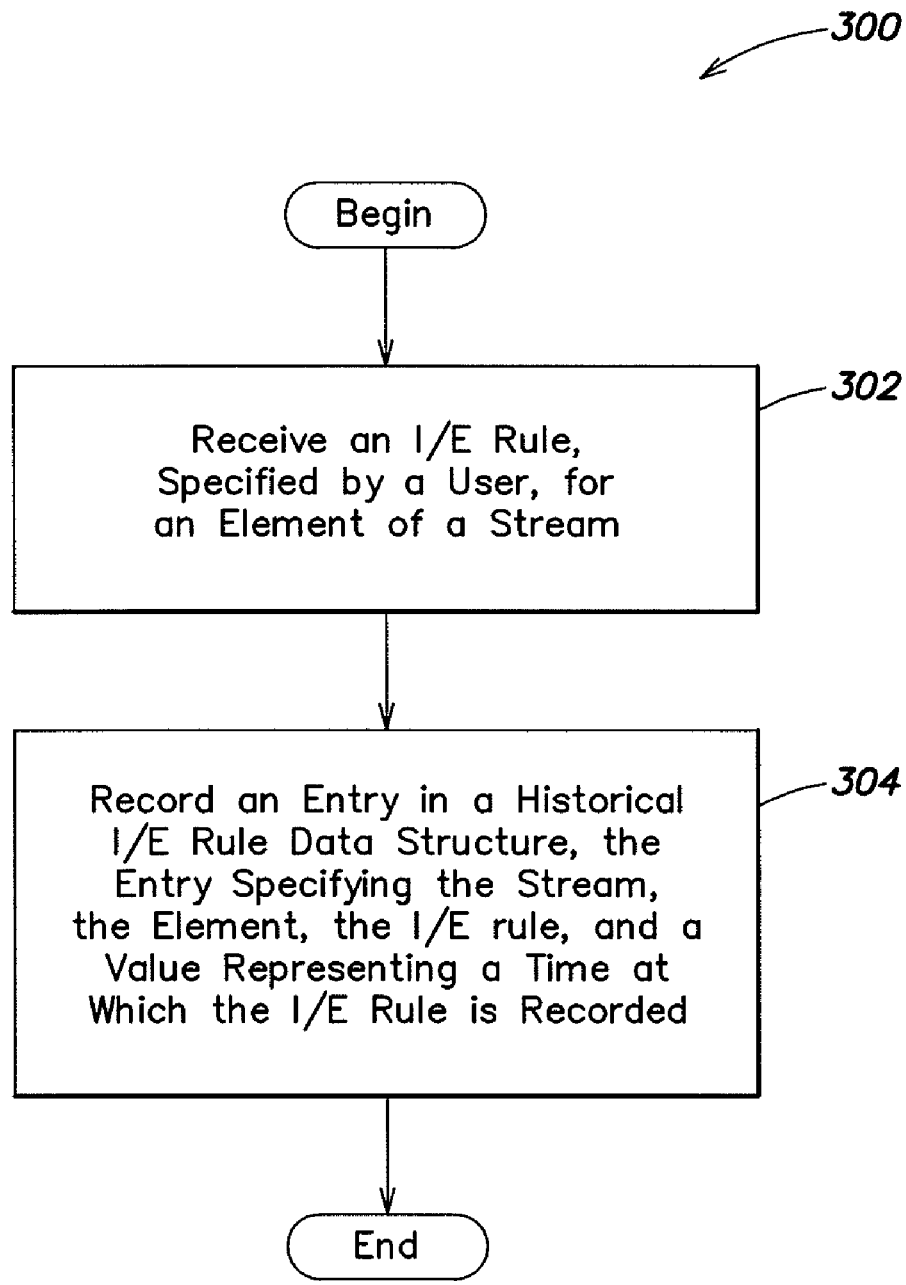
FIG. 3 is a flowchart illustrating an example of a method of recording an I/E rule specified by a user for an element of a stream.

FIG. 3 is a flowchart illustrating an example of a method 300 of recording an I/E rule specified by a user for an element of a stream. Method 300 is merely an illustrative embodiment of recording an I/E rule specified by a user for an element of a stream, which is not intended to limit the scope of the invention. Numerous other implementations of such a method, for example, variations of method 300, are possible and are intended to fall within the scope of the invention. Further, it should be appreciated that method 300 may include additional acts beyond those shown in FIG. 3.

In Act 302, an I/E rule specified by a user may be received for an element of a stream. Any of a variety of I/E rules may be specified, for example, one of the I/E rules specified above. The specified I/E rules may be specified using a user interface (e.g., a GUI), as is described below in more detail in relation to FIGS. 4-9.

In Act 304, an entry is recorded in a historical I/E rules data structure, for example data structure 900 described below in more detail in relation to FIG. 9. The recorded entry may, for example, indicate the stream, the element, the I/E rule and a value representing a time in which the I/E rule is recorded. For example, the value representing time may specify a standard time or a number (e.g., a serial number) corresponding to a standard time, for example, a transaction number described below in more detail. As used herein, a "time value" is a value representative of a time.

Recording a time value along with an I/E rule for an element of a stream enables a later determination of whether the element was included in a view of the stream at a particular time.

In some embodiments of the invention, a user interface (e.g., a GUI) may be provided that enables a user to specify I/E rules for one or more elements of a stream. This user interface may provide one or more views of the stream, including an I/E view for viewing and modifying (e.g., adding, changing and/or clearing) I/E rules. The one or more views also may include a content view for viewing and modifying the contents of a stream (e.g., for adding, changing, or purging software components from the stream). In some embodiments, the software components displayed in the content view (and thus seen by the user) are limited to those software components included in the view, such that only software components included in the view may be modified. Thus, excluded software components may not be visible or modifiable in the content view.

The I/E rules defined for a stream define a content view for the stream, and may be considered a sort of "mask" for the contents of the stream. I/E may be defined in a parent stream that has a plurality of child streams, including workspaces, such that these child streams inherit the I/E rules (although as described below, a system may be configured to allow I/E rules of a child stream to override a parent's I/E rules). Thus, an I/E rule may be specified once in a parent stream, and affect the content views of a plurality of users such as, for example, the users associated with child workspaces of the parent stream. Accordingly, the I/E rule does not have to be entered individually for each user, for example, in each workspace.

Examples of a content view and an I/E view, and the relationship between them, will now be described in more detail. It should be appreciated that views are not limited to the two types described below, but other types of views may be provided by a user interface, and are intended to fall within the scope of the invention.

Figure 4:
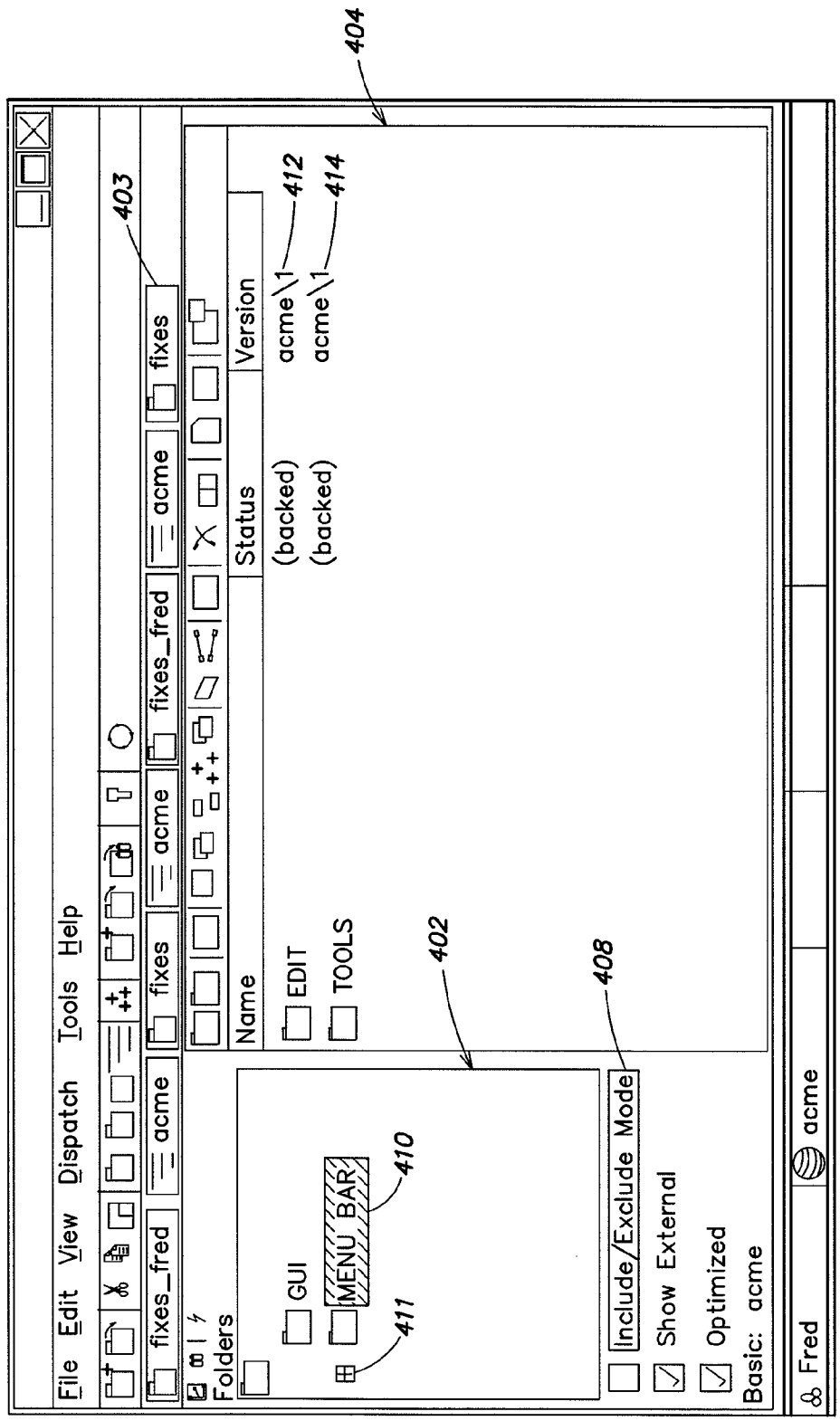
FIG. 4 is a screen shot illustrating an example of a view of a stream for modifying the content of a stream.

FIG. 4 is a screen shot illustrating an example of a content view 400 of a stream. Content view 400 may be displayed in response to a user selecting (e.g., double clicking on) stream 206 of GUI display 200 described above. The contents of stream 206 may (at least initially) include the software components of directory 100 described above in relation to FIG. 1.

View 400 may include a directory panel 402, stream indicator 403, directory elements panel 404 and I/E mode selector 408. Stream indicator 403 indicates the stream currently being displayed in view 400, for example, the stream named "fixes," which is stream 206 in stream hierarchy 201. Thus, content view 400 shows the directory elements included within stream 206.

Directory panel or window 402 may display a directory hierarchy, and may enable users to select a directory within the directory hierarchy. For example, directory panel 402 may enable a user to select directory indicator 410, which corresponds to directory 118 of hierarchy 100. The user interface may be configured such that, in response to a directory being selected, the view 400 displays the directory element indicators for the directory elements included within the directory, for example, in directory element panel 404. For example, in response to a user selecting directory indicator 410 (illustrated by the reverse highlighting of the words "MENU BAR"), element indicators 412 and 414 (for elements 120 and 124, respectively) may be displayed in directory element panel 404. Optionally, the user interface may be configured to enable a user to control a display, within directory panel 402, of indicators for directories included within a directory. For example, a user may be enabled to double click on directory indicator 410 or indicator 411 such that indicators for the directories 120 and 124 (which are directories included within directory 118) are displayed within directory panel 402.

The user interface may be configured to enable a user to select a mode for the user interface such as, for example, I/E mode or content mode. In some embodiments, such selection may be made using a device such as mode box 408. For example, if mode box 408 indicates that the mode is not I/E mode (e.g., by not including a checkmark), then the mode may (by implication) be content mode. Conversely, if mode box 408 includes a checkmark, then the user interface may be in I/E mode. The user interface may be configured such that, in response to a user entering a check mark or other mark within mode box 408 when the current mode is content mode, the mode switches to I/E mode. When the mode switches to I/E mode, an I/E view or modifying I/E rules may be invoked, for example, I/E view 500 of FIG. 5.

Figure 5:
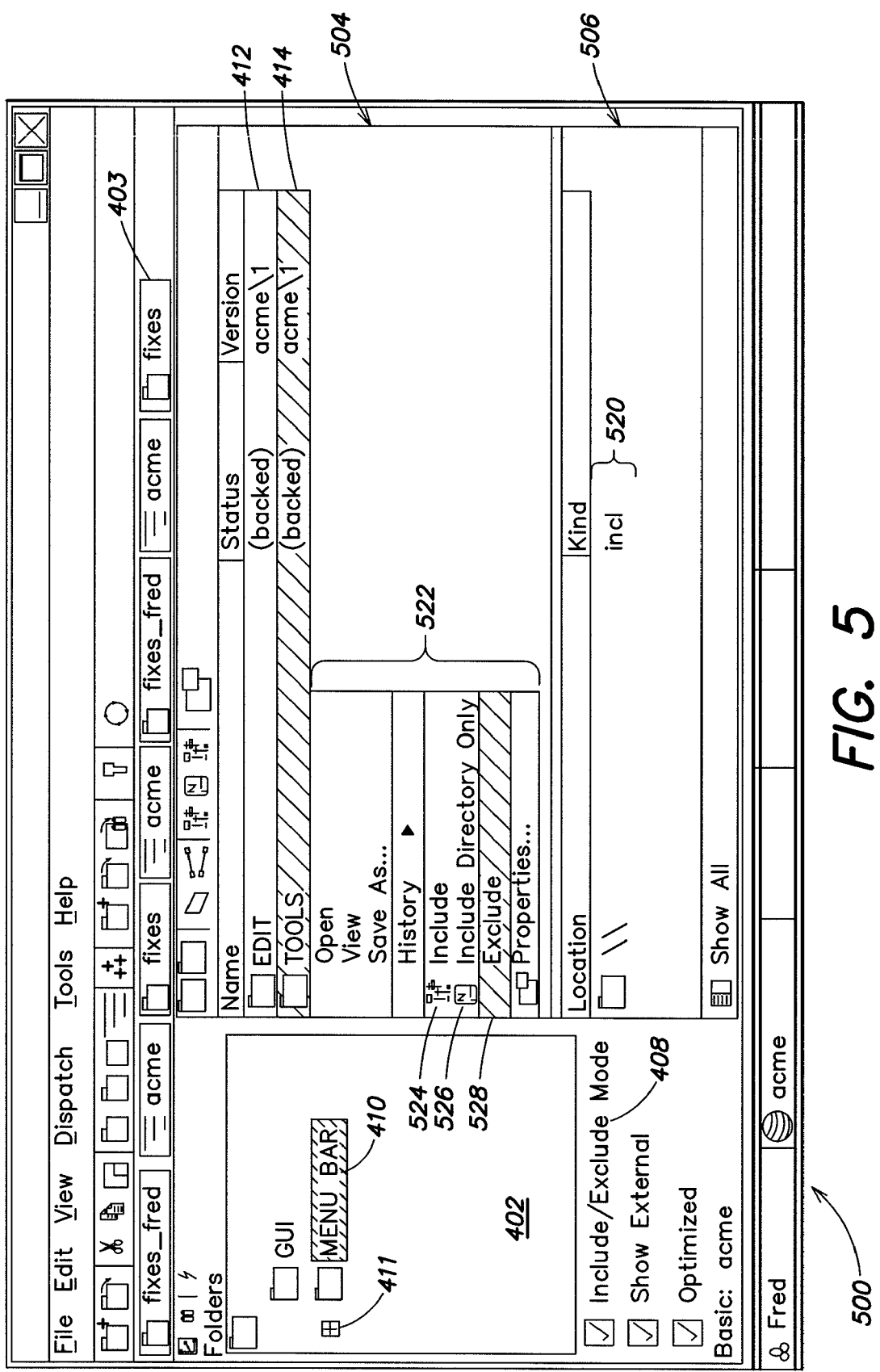
FIG. 5 is a screen shot illustrating an example of a view of a stream for entering I/E rules for elements of a stream, showing an exclude rule being specified.

FIG. 5 is a screen shot illustrating an example of an I/E view 500 of stream 206 (named "fixes" as illustrated by stream tab 403). View 500 may include some of the same or similar components to those provided in view 400. In view 500, I/E mode box 408 may indicate that the user interface is in I/E mode. The directory element panel 504 may be resized to accommodate tiled display of an I/E rule panel 506. I/E rule panel 506 may include a list of the I/E rules currently specified for the stream identified by stream indicator 403. In some embodiments, I/E rule panel 506 may include a default rule 520 indicating that the root directory is included within a stream by default.

The user interface may enable a user to select a directory element from panel 504 and specify a rule for the directory element. For example, the user interface may enable a user to select directory element indicator 414 (as indicated by the highlighting), which represents element 124 of directory 100.

The user interface may be configured such that, in response to a user inputting a command (such as, for example, by clicking a predetermined button on a mouse), view 500 displays menu 522. Menu 522 (which may be a drop-down menu or other type of menu) may provide a list of options pertaining to I/E rules for the selected directory element. For example, menu 522 may include indicator 524, IDO indicator 526 and exclude indicator 528 for defining an include rule, an IDO rule, and an exclude rule, respectively. In the example of view 500, highlighting indicates that a user has selected to define an exclude rule for the selected element 124 (named "TOOLS").

Figure 6:
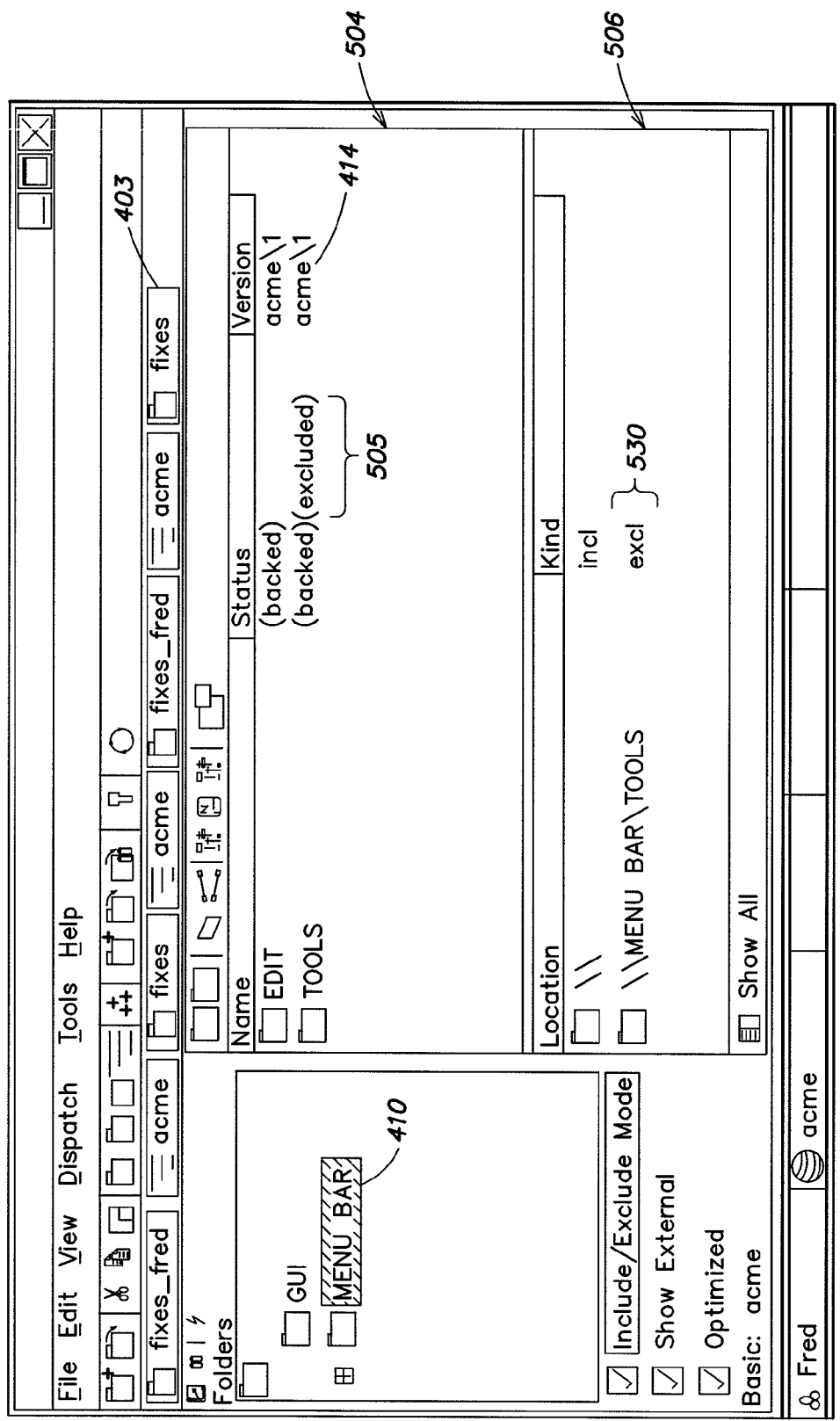
FIG. 6 is a screen shot illustrating an example of a view of a stream for entering I/E rules for elements of a stream, showing a result of an exclude rule being specified.

FIG. 6 shows an example of an I/E view 500' resulting from a user specifying an exclude rule for element 124. Element indicator 414 may include an exclusion indicator 505 indicating that the element 124 is excluded from stream 206. Further, I/E rule panel 506 may include a new entry 530 specifying that element 124 (i.e., "\MENU BAR\TOOLS") is excluded from element 124.

Figure 7:
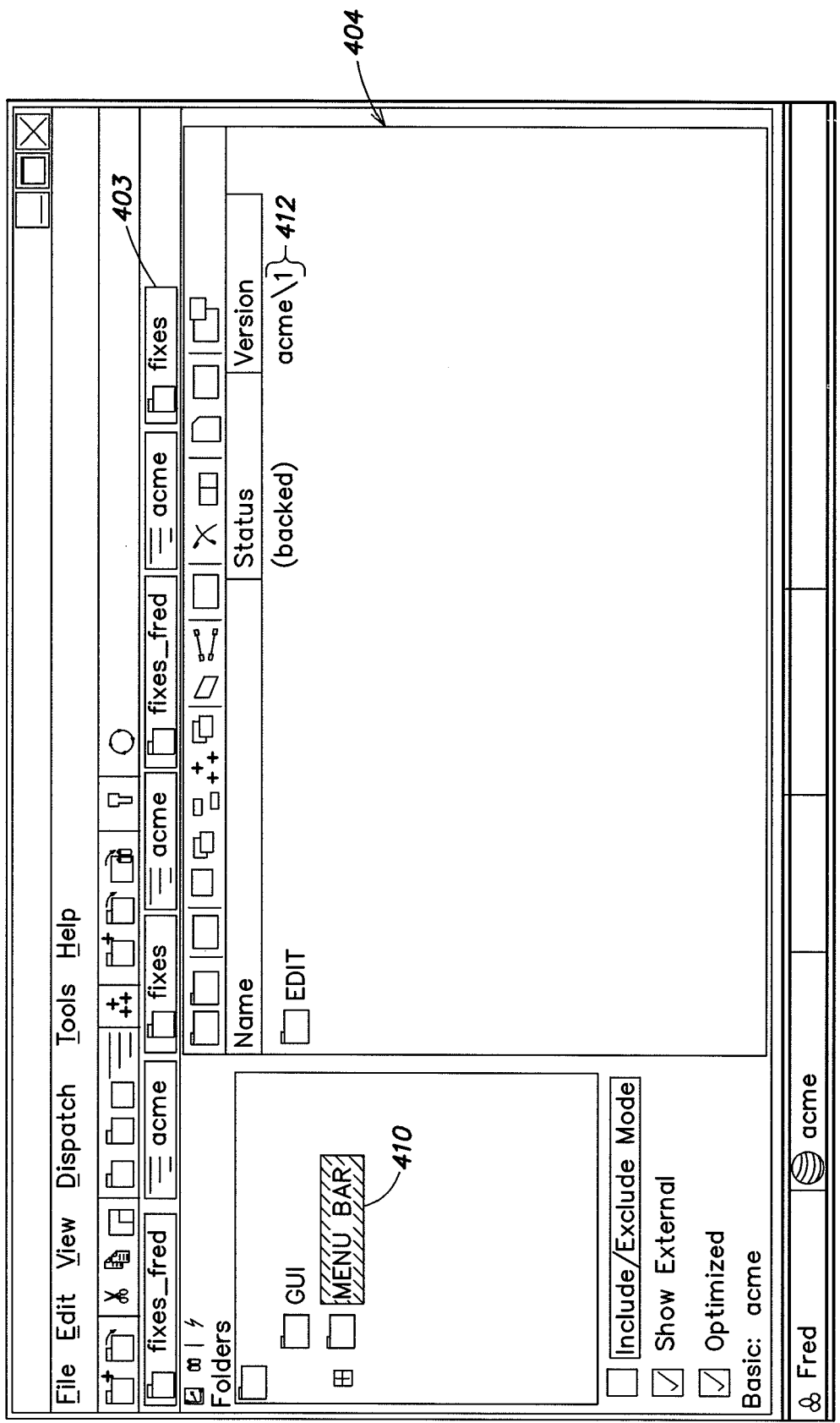
FIG. 7 is a screen shot illustrating an example of a view of a stream for modifying the content of a stream, showing a result of an exclude rule being specified.

FIG. 7 is a screen shot illustrating an example of a content view 400' that may result from the application of the exclusion rule 530 in FIG. 6. Content view 400' may show that for stream 206 ("fixes"), directory 118 (named "MENU BAR" as indicated by 410) only includes directory 120 (named "EDIT" as indicated by 412), and that directory 124 ("TOOLS") is no longer included in view 400.

Figure 8:
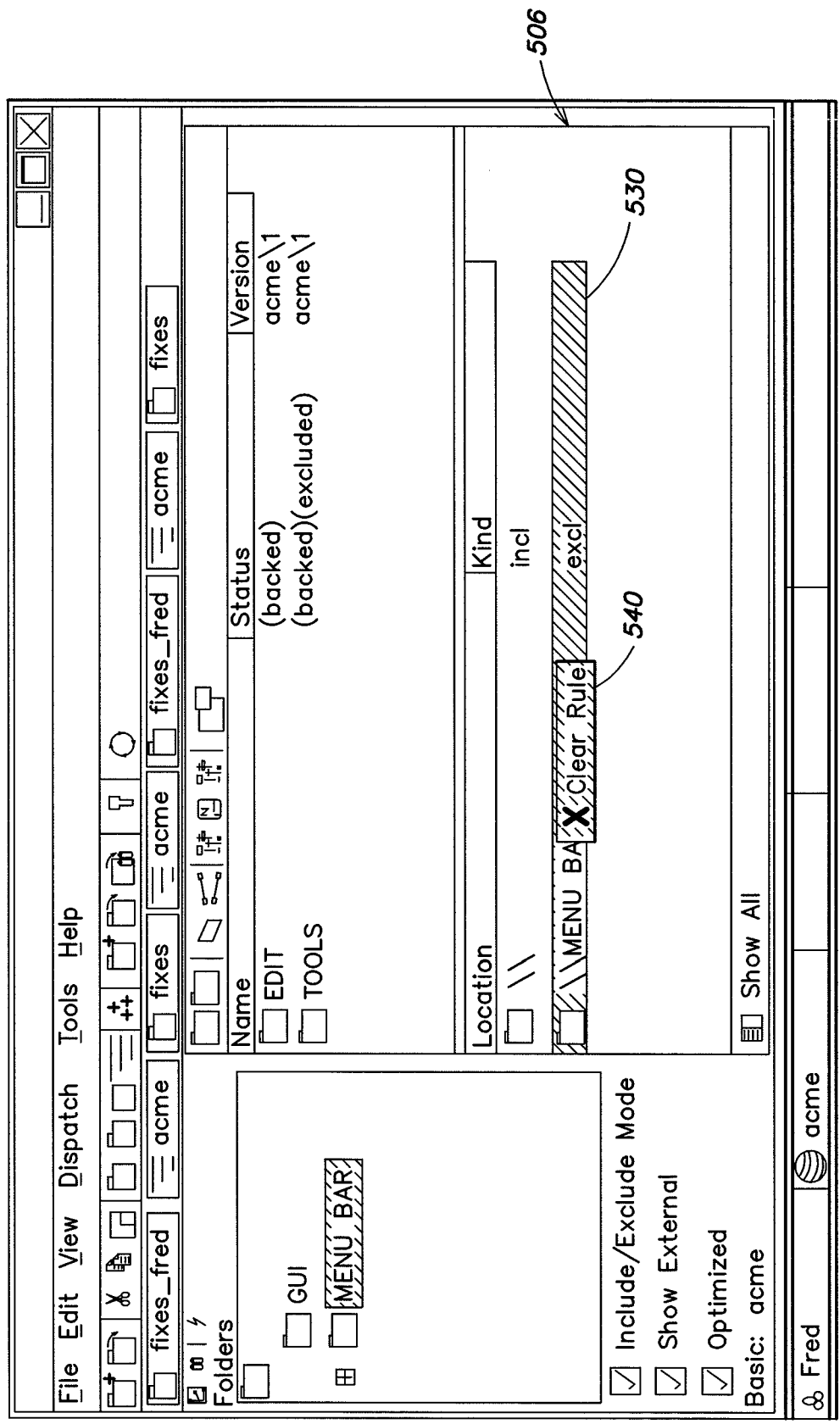
FIG. 8 is a screen shot illustrating an example of a view of a stream for entering I/E rules for elements of a stream, showing a clearing of an exclude rule.

The user interface may enable a user to clear an I/E rule from a stream, for example, as illustrated in FIG. 8. In FIG. 8, I/E view 500" indicates that I/E rule 530 has been selected by a user, for example, by clicking on rule 530 with a mouse. Further, the user has selected the clear command 540, for example, by clicking on a right button on a mouse. In response to the user clearing rule 530, the content view may be altered to again display element indicator 414, indicating that directory 124 is now included within directory 118 for stream 206 for the view.

In some embodiments of the invention, I/E rules defined for a stream are inherited by the stream's children. For example, I/E rule 530 illustrated in FIG. 6 may be defined for stream 206 ("fixes"). Referring to FIG. 2, stream hierarchy 201 shows that stream 206 is a parent of stream 208 ("fixes_george") and stream 210 ("fixes_fred"). Thus, streams 208 and 210 may be configured to inherit rule 530. Thus, a content view (e.g., 400 or 400') of stream 208 or stream 210 may show that directory 118 includes directory 120, but does not include directory 124. In other words, for both streams, directory elements panel 404 may not list directory 124 for directory 118.

It should be appreciated that GUI display 200 and views 400, 400', 500, 500' and 500" may be implemented on any of a variety of types of computer environments and platforms, for example, a windows-type environment. Application programming interfaces (APIs) may be provided, for example, by system 2000 and/or 2001 described below, to enable a programmer to implement any of the GUI displays and views described above on any of a variety of computing platforms.

Having now described an example of a user interface that enables a user to specify I/E rules for a stream, examples of data structures that enable a user to determine the contents of a view of a stream at a particular time (e.g., a past time) will now be described.

FIG. 9 is a block diagram illustrating an example of over suitable historical I/E data structure 900, though other data structures may be employed. Such a data structure may record changes to views of streams of a software entity (e.g., of a software development project) over time. Data structure 900 may be used to determine the software components included in a view of the stream at a particular time, for example, a past time, as will be described in more detail below. It should be appreciated that the arrangement of the data structure is not limited to the arrangement shown in FIG. 9. For example, the order of fields 902-910 and entries 912-922 may be different; other fields may be added and possibly one or more fields may be omitted. Instead of a single table, the data structure may be formed by multiple tables or have other embodiments. For example, as indicated by the values in transaction field 906, entries 912-922 may be listed in chronological order, a lower transaction number occurring before a higher transaction number. It should be appreciated, however, that the entries may be listed in other orders.

Data structure 900 may include a plurality of entries 912-922. Each entry may include a value for any one or more of: a stream ID field 902; an element ID (EID) field 904; a transaction field 906; an active field 908; and a kind field 910.

For an entry, the stream ID field 902 may hold a value representing a unique identifier of a stream, and EID field 904 may hold a unique identifier of a software component (e.g., a directory element). The identifier preferably is "unique" in the sense that it is assigned to the component on the component's creation and it stays with the component. The value held in an EID field 904 may be any of a variety of types such as, for example, numerical, alphabetical, alpha-numeric, etc. If the element represented by an EID is a file or directory, providing a numerical value may avoid problems commonly encountered in known systems where an alphabetic identifier is used. For example, files and directories are frequently renamed, such that a current name of a file or directory may not be a same name that the file or directory had in the past. Further, the current name may be a name formerly used by another file or directory. The ability of a file or directory named to change over time, and the absence of another unique identifier that remains constant, may create confusion and cause problems when an attempt is made to determine a status of a file or directory at a past time. For example, in some CM applications, if an attempt is made to determine the status of a file in the past (e.g., by resorting to tape backup), and the file had a different name and another file had the file's current name, the wrong file may be identified and an incorrect status determined. This problem may be eliminated by providing a unique numerical identifier for a file or directory that remains constant throughout the life of a file or directory, regardless of whether the file's or directory's name is changed. Similar benefits may be realized by using a numerical value as a unique identifier of a stream.

Transaction field 906 may hold a transaction number or other value corresponding to a time at which the entry was made. Active field 908 may hold a value specifying whether the I/E rule represented by the entry is "active" at the time of the entry (i.e., at the time corresponding to the transaction number). An "active" I/E rule is an enabled rule, whereas an "inactive" I/E rule is a disabled rule (i.e., a rule that has been and remains cleared). An active I/E rule is applied to the software component for which it is defined, whereas as an inactive rule is not applied. The value held in an active field 908 may be any of a variety of types of values such as, for example a Boolean value, such as "1" representing "true," and "0" representing "false." As will be explained in more detail below, an I/E rule may be active by default unless it has been cleared. Thus, a value of "1" may represent that, at the time of the entry, the I/E rule was active, whereas a value of "0" may represent that, at the time of the entry, the I/E rule was inactive.

Kind field 910 may hold a value indicating a kind of I/E rule represented by the entry, for example, an exclude rule, an include rule or an IDO rule. Other types of I/E rules may be specified.

The values shown in FIG. 9 for data structure 900 may result from the adding, changing and/or clearing of I/E rules for directory elements of directory hierarchy 100 for stream hierarchy 201. For the purposes of illustrating examples of content of data structure 900, and data structures 1000 and 1100 described below, Table 1 below shows EIDs of some of the directory elements of directory hierarchy 100.

TABLE 1

| | EIDs of Directory Elements | |
|---|---|---|
| EID | FIG. 1A Identifier | Name |
| 1 | 101 | (root) |
| 2 | 102 | GUI |
| 3 | 114 | screen.cc |
| 4 | 106 | sys.cc |
| 5 | 118 | MENU BAR |
| 6 | 120 | EDIT |
| 7 | 124 | TOOLS |
| 8 | 122 | delete.cc |
| 9 | 126 | foo.cc |
| 10 | 128 | bar.cc |

Further, for illustrating an example of the contents of data structures 900, 1000 and 1100, Table 2 below illustrates stream IDs of some of the streams of stream

TABLE 2

| | Stream IDs of Streams | |
|---|---|---|
| Stream ID | FIG. 2 Identifier | Name |
| 1 | 202 | acme |
| 2 | 206 | fixes |
| 3 | 210 | fixes__fred |
| 4 | 208 | fixes__george |
| 5 | 204 | acme__dan |

Using Tables 1 and 2 as a reference, the entries of data structure 900 may have resulted from the following transactions. Such transactions may have been performed by a user using the user interface that presents I/E view 500, 500' and/or 500", described above in relation to FIGS. 5, 6 and 8.

Entry 912 may result from a user entering an I/E rule specifying to exclude directory 124 ("TOOLS") from stream 206 ("fixes"). Entry 914 may result from a user entering an I/E rule specifying to exclude directory 120 ("EDIT") from stream 206. Entry 916 may result from a user entering an I/E rule specifying to clear the exclude rule specified for directory 124 for stream 206, which is represented by entry 912. Entry 918 may result from a user specifying an IDO rule to include directory 124, but not any of its children (unless an overriding I/E rule is specified for the child), from stream 210 ("fixes-_fred"). Entry 920 may result from a user entering an include rule specifying to include file 128 ("bar.cc") in stream 210. Entry 922 may result from a user entering an include rule specifying to include directory 120 ("EDIT") in stream 210.

As will be explained in more detail below, historical I/E data structure 900 may be used in determining the logical components included within a view of a stream at a particular time in the past. In some embodiments of the invention, other data structures are used to help make such a determination such as, for example, data structures 1000 and 1100, which will now be described.

FIG. 10 is a block diagram illustrating an example of a historical stream hierarchy data structure 1000. As described above in relation to FIG. 2, the position of a stream within a stream hierarchy may change over time. Data structure 1000 may be used to record these changes such that the state of the stream hierarchy at a particular time may be determined. Further, a stream ancestry chain of a stream may be determined using data structure 1000, for example, as described below in relation to FIGS. 12 and 13.

Data structure 1000 may include a plurality of entries 1010-1024. Each entry may hold a value for any of the following fields: stream ID field 1002; name field 1004; parent stream ID field 1006; and transaction field 1008. Data structure 1000 may include more or less than the number of entries and fields shown in FIG. 10, and the order of entries 1010-1024 and fields 1002-1008 may be different than as shown in FIG. 10.

For each entry: stream ID field 1002 may hold a unique identifier for a stream; name field 1004 may hold a name of the stream identified in field 1002; parent stream ID field 1006 may hold a unique identifier of the parent stream of the stream identified in field 1002; and transaction field 1008 may hold a transaction number or other value corresponding to a time at which the entry was created. Each entry may have been created to record a change of a name of a field or a change of a relationship between a stream and its parent (i.e., a change of location within the stream hierarchy). For example, entries 1010-1024 may have resulted from the following transactions, which may be better understood with reference to Table 2 and FIG. 2.

Entry 1010 may have resulted from the creation of stream 202 ("acme"). In some embodiments, a parent stream ID of "0" may be assigned as the stream ID of a parent of a source stream because such a value is not eligible to be a stream ID of a stream. Thus, a parent stream ID equal to "0" may serve as an indication that an entry in data structure 1000, for example, entry 1010, represents a source stream (e.g., stream 202). Other values may be used as a parent stream ID, so long as the value is not eligible to be a stream ID of a stream.

Entry 1012 may have resulted from the creation of stream 206 as a child of source stream 202. Entries 1014 and 1016 may have resulted from the creation of streams 208 and 210, respectively, as children of stream 206.

Entry 1018 may have resulted from the creation of stream 204, which at the time was named "fixes_dan." As indicated in entry 1018, at the stream 204 time of transaction number 5 (i.e., the transaction that created stream 204), was a child of stream 206.

Entry 1020 may have resulted from the moving of stream 204 within the hierarchy to the location illustrated in stream hierarchy 201, and from the changing of the name of stream 204 from "fixes_dan" to acme_dan." In some embodiments of the invention, a name of a workspace automatically includes the name of its parent stream. Such an intuitive naming convention may assist a user in understanding a position of a workspace within a stream hierarchy, in particular the workspace's parent stream. Thus, stream 204 may be a workspace and the change of name reflected in entry 1020 may have resulted automatically from the changing of the parent of workspace 204.

Entry 1022 may have resulted from the creation of stream 210, originally named "acme_fred," as a child of stream 202. Entry 1024 may have resulted from the moving of stream 210 within the hierarchy 201 to its current location as a child of stream 206.

Data structure 1000 may represent a history of stream hierarchy 201. It should be appreciated that data hierarchy 1000 is merely one example of how stream hierarchy 201 may have been formed. Stream hierarchy 201 may have been formed in any of a variety of ways, resulting in one or more entries in historical stream hierarchy data structure 1000 different from those depicted in FIG. 10.

FIG. 11 is a block diagram illustrating an example of a historical element location data structure 1100. Data structure 1100 may represent a history of the software components (e.g., files and directories) included within streams of a software entity (e.g., for example, a software development project). In other words, data structure 1100 may represent a history of the content of a stream, as opposed to a history of the contents of a view of a stream, which may be represented by data structure 900. As will be described below in more detail, data structure 1100 may be used in determining the contents of a view of a stream at a particular time. For example, data structure 1100 may be used to determine the software components (e.g., directory elements) that are eligible to be included in a view of a stream at a particular time.

Data structure 1100 may include a plurality of entries 1118-1144. Each entry may include a value for any of the following fields: parent EID field 1102, name field 1104, stream ID field 1106, transaction field 1108, EID field 1110, defunct field 1112, directory field 1114, and in-progress field 1116.

Parent EID field 1102 may hold a value representing the EID of the software component that is the parent of the software component represented by entry 1118, the EID of which may be held in EID field 1110. Name field 1104 may hold a value indicating a name of the software component specified by EID field 1110. Stream ID field 1106 may hold a value specifying an ID of the stream to which the entry applies. Transaction field 1108 may hold a value representing a transaction number or other serial number corresponding to a time at which the entry was made. EID field 1110 may hold the EID of the software component represented by the entry.

Defunct field 1112 may hold a value indicating whether the software component indicated by field 1110 is defunct for the stream indicated by field 1106. A software component is defunct for a stream if the software component has been removed from the stream such that it is no longer included within the stream. A value stored in defunct field 1112 may have any of a variety of types such as, for example, a Boolean value having a value equal to "1" if the software component is defunct for the stream at the time of the transaction, and having a value equal to "0" if not defunct for the stream at the time of the transaction. As will be described in more detail below, a software component may be removed (i.e., defuncted) within a workspace and subsequently promoted up through a stream hierarchy to the source stream. In response to the software component being removed, an entry may be made in data structure 1100 having a value of "0" in defunct field 1112. Further, a defunct value entry equal to "0" may be made for each stream to which the removed software component is promoted.

Directory field 1114 may hold a value indicating whether the software component represented by the entry is a directory. The value may be any of a variety of types, for example, a Boolean value where a value equal to "1" means that the software component is a directory and a value equal to "0" means that the software component is not a directory (e.g., is a file).

Field 1116 may hold a value indicating whether the software component is in progress for the stream at the time corresponding to the value of transaction field 1108. A software component of a stream is "in progress" if a modification has been made to the software component (i.e., it has been added, modified, or removed) and the stream has not been promoted to a parent stream. If a software component is in progress within a stream, then the version of the software component in the stream and its children may be different than the version of the software component elsewhere within the stream hierarchy. For example, the software component may not even exist in other streams in the hierarchy, or may be removed from the subject stream and its children, but present in other streams of the stream hierarchy.

Entries 1118-1144 may have resulted from the following transactions, which may be better understood with reference to FIGS. 1 and 2 and Tables 1 and 2 above. Although entries 1118-1144 appear in chronological order (as indicated by the ascending transaction numbers), the entries may be ordered in any of a variety of ways. For example, the entries may be sorted or indexed according to one or more other fields. Further, the fields within data structure 1100 may be ordered in any other variety of ways, not just the order represented in FIG. 11, which is merely one example provided for illustrative purposes.

Entry 1118 may have resulted from the creation of directory 102 ("GUI") in stream 210 ("fixes_fred"). As indicated in entry 1118, initially directory 102 is not defunct and is in progress within stream 210, which may be, for example, a workspace.

Entry 1120 may result from the creation of file 114 ("screen.cc") in directory 102 for stream 210. Similarly to entry 118, entry 1120 reflects that directory 114 initially is not defunct and is in progress in stream 210. However, in contrast to entry 118, entry 1120 indicates in field 1114 that file 114 is not a directory.

Entry 1122 may have resulted from the creation of file 106 ("sys.cc") in stream 204 ("acme_dan"). Entries 1124 and 1126 may result from the promotion of file 106 from stream 204 to stream 202 ("acme"). In entry 1124, field 1116 indicates that file 106 is no longer in progress in stream 204, which may result from the fact that file 106 was promoted to stream 202. Further, in entry 1126, field 1116 indicates that file 106 is now in progress in source stream 202. It should be appreciated that, if a software component (e.g., a file or directory) is in progress in the source stream, but not in any of its descendant streams, then all streams within the stream hierarchy have a same version of the software component.

Although not reflected in data structure 1108, after file 106 is promoted to source stream 202, a view of stream 204 may be updated to reflect that stream 204 now inherits the inclusion of file 106 from source stream 202. This update reflects the fact that, if a parent stream includes a software component, then a child's stream may also include this software component by inheritance. An exception would be if the software component has been removed in the child stream, but has not been promoted to the parent stream since the purging. Stream updates may be recorded in a separate data structure.

Entry 1128 may result from file 106 being removed in stream 204. Defunct field 1112 for this entry may indicate file 106 is removed for stream 204, and field 1116 may indicate that file 106 is now in progress within stream 204 (e.g., until it is promoted to stream 202).

Entries 1130 and 1132 may result from file 106 being promoted from stream 204 to stream 202. In entry 1130, field 1116 reflects that file 106 is no longer in progress within stream 204. In field 1132, fields 1112 and 1116 reflect that file 106 is defunct and in progress within stream 202.

Entries 1134, 1136, 1138, 1140, 1142 and 1144 may represent the additions of the following software components, respectively, to stream 204: 118 ("MENU BAR"), 120 ("EDIT"); 124 ("TOOLS"), file 122 ("delete.cc"), file 126 ("foo.cc"); and file 128 ("r.cc").

Having now described an example of a user interface for entering rules for a stream, and examples of data structures for recording modifications to the contents of a stream, modifications to the contents of a view of a stream and modifications to a stream hierarchy, a method of determining the contents of a view of a stream at a particular time will now be described.

Figure 12:
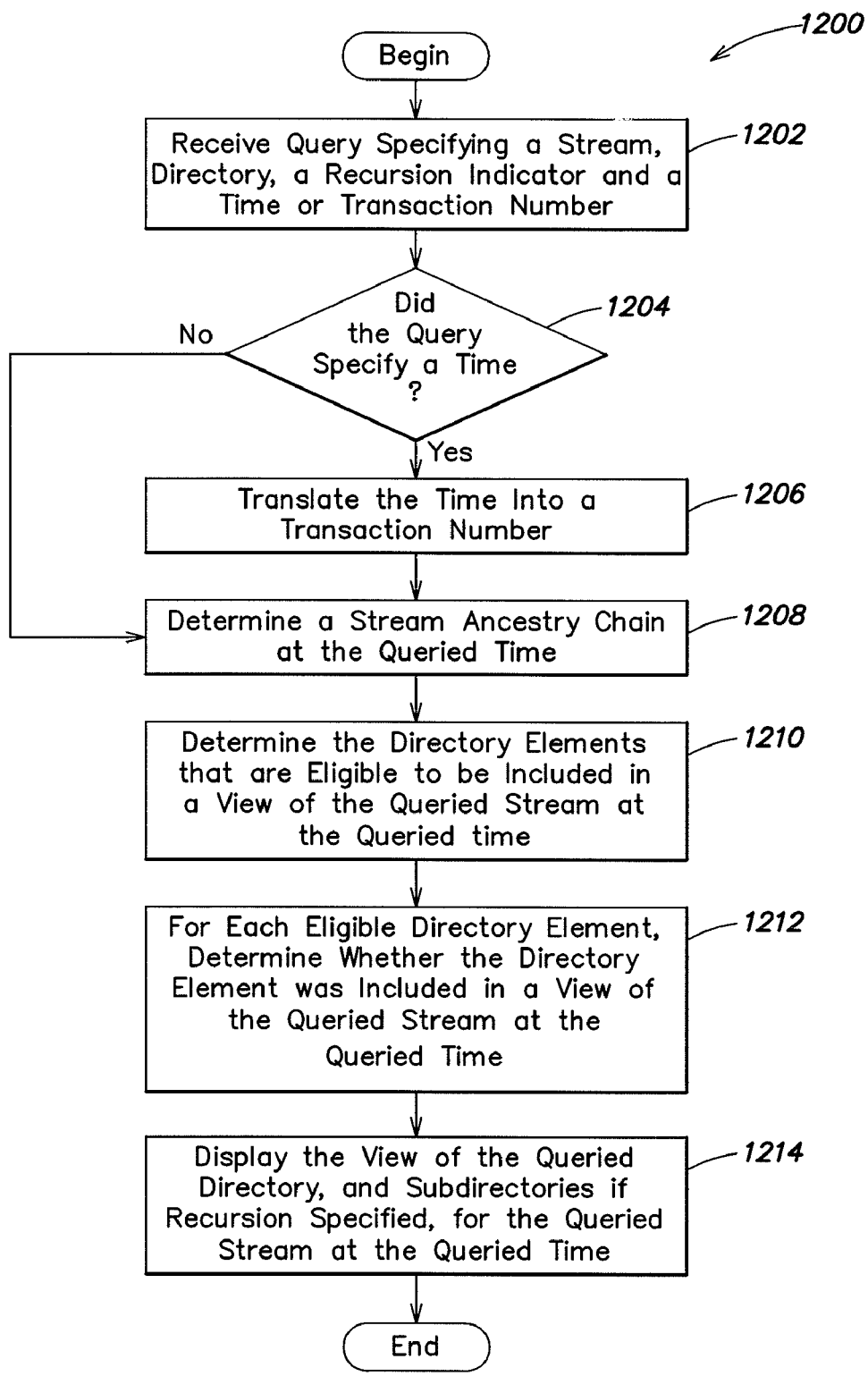
FIG. 12 is a flowchart illustrating an example of a method of determining and displaying a view of a directory for a stream at a particular time.

FIG. 12 is a flowchart illustrating an example of a method 1200 of determining and displaying a view of a directory (e.g., a root directory or one of its sub-directories) for a stream at a particular time. Method 1200 is merely an illustrative embodiment of a method of determining and displaying a view of a directory for a stream at a particular time period, which is not intended to limit the scope of the invention. Any of numerous other implementation of such a method, for example, variations of method 1200, are possible and are intended to fall within the scope of the invention. Although method 1200 is described in relation to a file hierarchy of directory elements (e.g., files and directories), it should be appreciated that method 1200 may be applied to software components of any of a variety of other types (e.g., objects, records, tables, etc.) organized in any of a variety of ways.

In Act 1202, a query may be received. This query may specify any of a stream, directory, a recursion indicator (described below) and a time or transaction number. Act 1202 may be performed in response to a user pointing and clicking on, or otherwise selecting, a stream from a display provided by a user interface, for example, GUI display 200.

Alternatively, Act 1202 may be performed in response to the selection of a directory from a directory panel 402 of a content view of a stream such as, for example, content view 400 or 400' described above in relation to FIGS. 4 and 7. In such embodiments, the results of method 1200 may be displayed in a directory elements panel 404 of a content view 400 or 400', for example, as described in more detail below in relation to Act 1214. Method 1200 also may be performed in response to a query being entered by a user, for example, through a user interface.

The directory specified by the query may be a root directory or any directory included within a file hierarchy. The directory may have been specified by a user, for example, by specifying the value in query or by clicking on or otherwise selecting a directory from a user interface display (e.g., directory panel 402 of content view 400 or 400'). If no directory has been specified in the query, the directory may default to a root directory of a file hierarchy.

A recursion indicator may be included within the query that specifies whether or not to perform recursion as part of method 1200. Performing recursion involves not only determining the contents of the queried directory (e.g., the root directory), but determining the contents of the directories included within the queried directory, for example, all of the directory's descendents. The recursion indicator may be represented by any of a variety of types of values, for example, a Boolean value. If the recursion indicator indicates not to perform recursion, then method 1200 may include only determining whether the child elements of the queried directory are included within the queried directory, but not making such a determination for all of the remaining descendents of the queried directory.

The query may include a time, for example, a standard time (e.g., January 2, 152, 1:52:15). Alternatively, the query may include a transaction number or other type of serial number, wherein this number corresponds to a time, e.g., a standard time. For example, the query may specify transaction number "10492," which corresponds to a specific date and time. If no time or transaction number is specified by the query, time may default to the time at which the query was received. For example, a user may simply click on a stream in GUI display 200 or a directory in directory panel 402 of content view 400 or 400' without specifying any time at all. In these cases, it may be inferred that the user wants to know the contents of the view at the current time.

The following examples of values are referred to throughout the description of method 1200 as being specified by the query: query stream 210 ("fixes_fred"); directory 101 (i.e., the root directory); and a time equal to or later than the time corresponding to transaction 54 (shown in entry 922 of data structure 900 described above in relation to FIG. 9). Further, in this recurring example, the query specifies that recursion is to be performed.

In Act 1204, it may be determined whether the received query specified a time or a transaction number (if both are allowed). If the query specified a time, then, in Act 1206, the time preferably is translated into a transaction number. For example, the transaction data structure described above may be accessed to translate (i.e., map) the time into a transaction number. For example, a specified time may be translated to the transaction number of the transaction recorded closest to and preceding the specified time.

As used herein, a "queried time" is either the time specified by the query or a time corresponding to the transaction number specified by the query. The time corresponding to a transaction number may be the time indicated by the entry of the transaction data structure, or an index derived therefrom, that represents the transaction identified by the transaction number.

If the query does not specify a time (i.e., the query specifies a transaction number), or after the performance of Act 1206 if a time was specified in the query, in Act 1208 a stream ancestry chain may be determined for the queried time. As used herein, a "stream ancestry chain" of a stream is the ancestry path from the queried stream to the source stream, including the queried stream and the source stream. For example, referring to stream hierarchy 201 of FIG. 2, the stream ancestry chain of stream 208 includes, in the following order, stream 208, stream 206 and stream 202, but not stream 204. The stream ancestry chain of stream 210 would include streams 210, 206 and 202, but not stream 204, and the stream ancestry chain of stream 204 would include stream 204 and 202, but not any of streams 206, 208 and 210.

Figure 13:
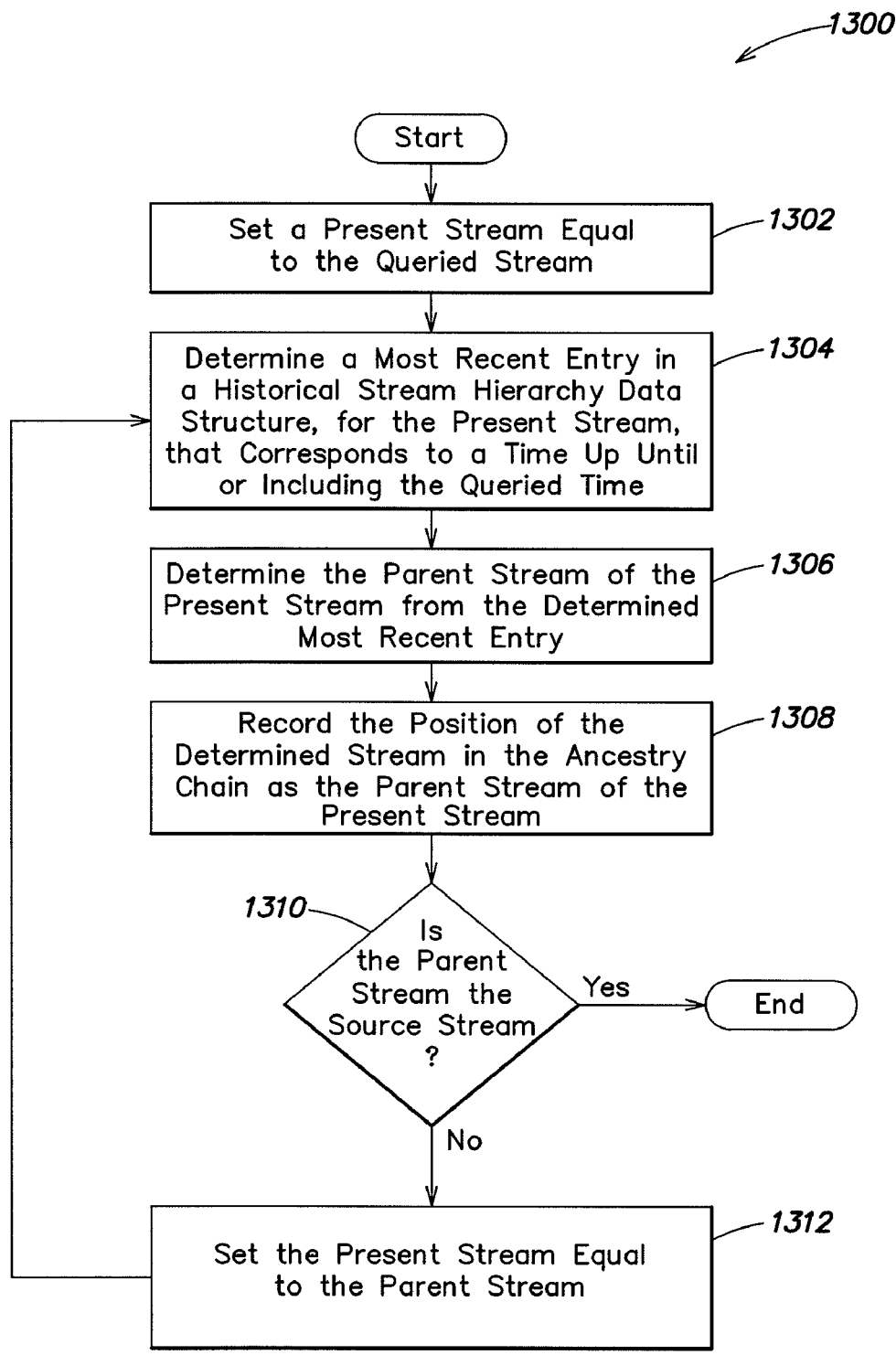
FIG. 13 is a flowchart illustrating an example of a method of determining a stream ancestry chain for a stream at a particular time.

Digressing briefly from method 1200, FIG. 13 is a flow chart illustrating an example of a method 1300 of determining a stream ancestry chain for a stream at a particular time. Method 1300 is merely an illustrative embodiment of determining a stream ancestry chain for a stream at a particular time, and is not intended to limit the scope of the invention. Numerous other implementations of such a method, for example, variations of method 1300, are possible and are intended to fall within the scope of the invention.

In Act 1302, a value of a present stream (i.e., a present stream variable) may be set equal to a value of the queried stream. For example, the present stream may be set equal to a value representing stream 210 (e.g., stream ID=3).

In Act 1304, a most recent entry in a historical stream hierarchy data structure for the present stream, that corresponds to a time up until or including the queried time, may be determined. For example, if the queried stream is stream 210 (stream ID=3) and the queried time is a time corresponding to transaction 54 or later, then Act 1304 may select entry 1024 of historical stream hierarchy data structure 1000.

In Act 1306, the parent stream of the present stream may be determined from the most recent entry determined in Act 1304. For example, stream 206 (stream ID=2) may be determined from the parent stream ID in field 1006 of entry 1024. Act 1306 may include determining that the present stream is the source stream, for example, by determining that the value of the parent stream ID field 1006 of the most recent entry is "0."

In Act 1308, the position of the determined parent stream in the ancestry chain may be recorded. For example, a temporary data structure defined by one or more variables may hold values indicating the position. This temporary data structure may be initialized by recording the queried stream as the lowest link (e.g., the stream lowest in the stream hierarchy) in the ancestry chain.

If it was determined in Act 1036 that the parent stream is the source stream, then Act 1310 may control method 1300 to end. In other words, if the parent stream is the source stream, there are no further ancestors in the stream ancestor chain.

If the parent stream is not the source stream, then in Act 1312, the present stream may be set equal to the parent stream. For example, the variable holding a value representing the present stream may be set equal to stream 206 (e.g., may be set equal to 2, the stream ID of stream 206). The method then may return to Act 1304 and repeats steps 1304-1310 for the new present stream.

For example, in Act 1304, the method may determine entry 1012, which is the most recent entry in data structure 1000 for stream 206 that corresponds to a time (i.e., the time corresponding to transaction 2) up until or including the queried time (i.e., a time corresponding to transaction 54 or later). In Act 1306, the parent stream of stream 206 may be determined to be stream 202 (stream ID=1). In Act 1308, the position of the parent stream in the ancestry chain may be recorded, and in Act 1310, it may be determined that stream 202 is the source stream, such that the method ends.

The result of the performance of method 1300 is a stream ancestry chain which may be used for the remainder of the performance of method 1200. For example, the results may be a stream ancestry chain reflecting that, at the queried time, stream 210 is a child of stream 206, which is a child of source stream 202.

Method 1300 may include additional acts. Further, the order of the acts performed as part of method 1300 is not limited to the order illustrated in FIG. 13, as the acts may be performed in other orders and/or one or more of the acts may be performed in parallel (at least partially).

Returning to method 1200 and FIG. 12, the directory elements that are eligible to be included in a view of the queried stream at the queried time may be determined in Act 1210. These determined directory elements may be considered "candidates" for inclusion in the view of the queried stream and directory. For example, Act 1210 may comprise determining contents of the queried stream at the queried time, as opposed to the contents of the view of the queried stream at the queried time. As will be described in more detail below, Act 1210 may include accessing a historical element location data structure, for example, data structure 1100.

In a following Act 1212, for each directory element determined to be eligible in Act 1210, it may be determined whether the directory element was included in a view of the queried stream at the queried time. Act 1212 may involve accessing historical I/E data structure 900, which is described in more detail below.

In some embodiments, Acts 1210 and 1212 may be performed as independent, discrete acts. In such embodiments, Act 1210 may record all of the eligible directory elements, and then Act 1212 may be performed for each of the recorded directory elements. In alternative embodiments, Acts 1210 and 1212 may be performed in a more integrated fashion, for example, as is described below in relation to FIGS. 14-19.

In Act 1214, the determined view of the queried directory (and its sub-directories if recursion was specified in the query) for the queried stream at the queried time may be displayed. The results of the query may be displayed by a user interface (e.g., a GUI) as part of a user interface display (e.g., GUI display), for example, in directory element panel 404 of content view 400 or 400' shown in FIGS. 4 and 7, respectively. Act 1214 may include accessing information recorded during the performance of Acts 1202-1212, from which the software components to include in the view may be determined.

Method 1200 may include additional acts. Further, the order of the acts performed as part of method 1200 is not limited to the order illustrated in FIG. 12, as the acts may be performed in other orders and/or one or more of the acts may be performed (as least partially) in parallel. For example, although in the example of method 1200, Act 1214 is shown as an independent, discrete act from Acts 1210 and 1212, Acts 1210, 1212 and 1214 may be performed in a more integrated fashion. For example, each element determined to be in the view may be displayed during the continued performance of Acts 1210 and 1212.

Figure 14:
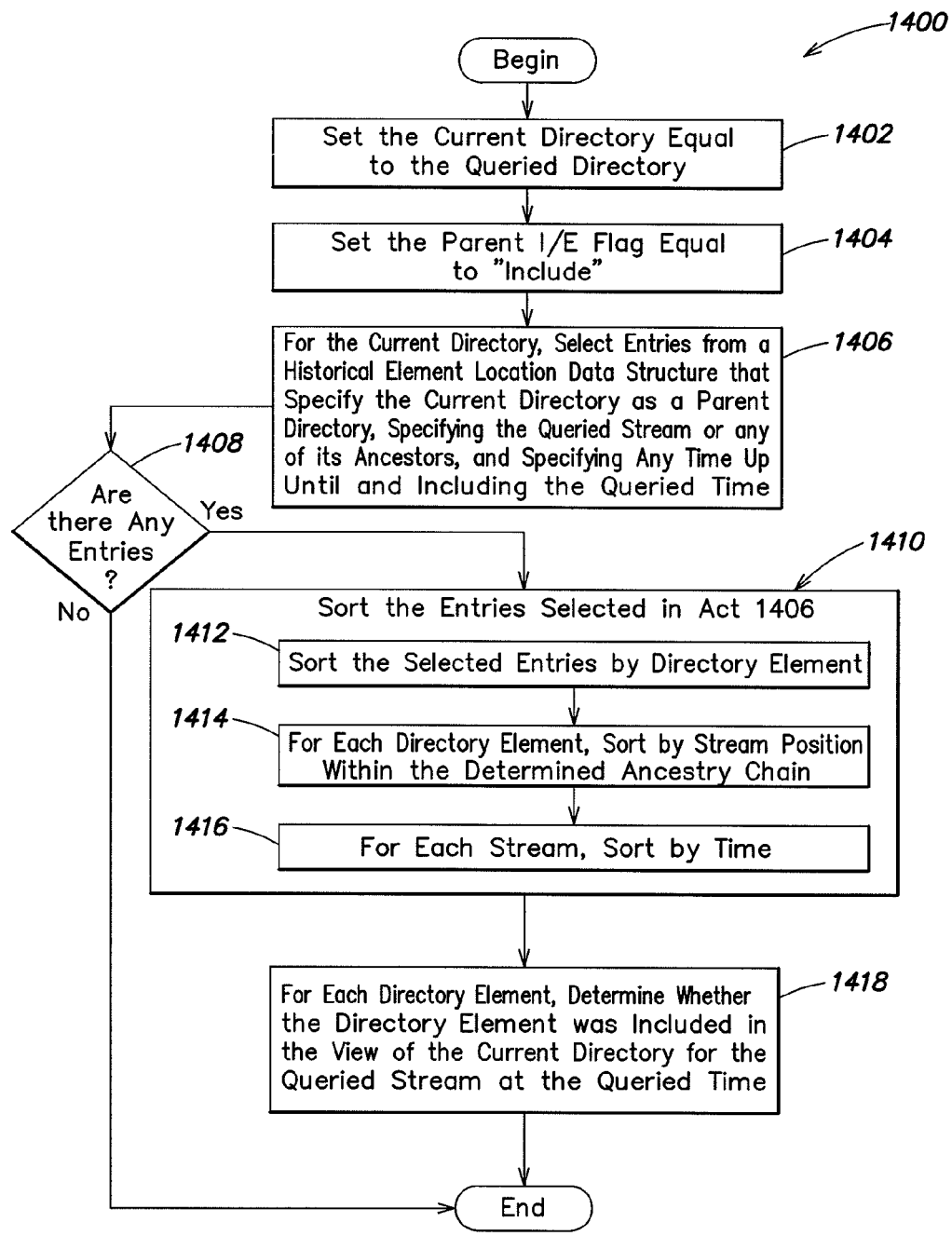
FIG. 14 is a flowchart illustrating an example of a method of determining the logical components included in a view of a directory for a stream at a particular time.

FIG. 14 is a flowchart illustrating an example of a method 1400 of determining the logical components included in a view of a directory for a stream at a particular time. Method 1400 is an example of how Acts 1212 and 1214 can be performed in an integrated fashion, as will become more clear from the following description. Method 1400 is merely an illustrative embodiment of a method of determining the logical components included in a view of a directory for a stream at a particular time, and is not intended to limit the scope of the invention. Numerous other implementations of such a method, for example, variations of method 1400, are possible and are intended to fall within the scope of the invention.

In Act 1402, a current directory variable may be set equal to the query directory. For example, Act 1402 may include setting the current directory variable equal to a value representing root directory 101, such as the EID of root directory 101, "1."

In Act 1404, a parent I/E flag may be set equal to "Include." The parent I/E flag may be used to keep track of the I/E rule specified for a parent directory of the current directory. As will become more clear from the following description, if recursion has been specified by the query, then method 1400 may include the performance of nested loops, with the outer loops being performed to determine the contents of the view of the queried directory and the inner loops being performed to determine the contents of the one or more descendant elements of the queried directory.

If it is determined that the directory is to be excluded from the view, then there may be no performance of the loops for the directory elements included within the respective directory. However, if it is determined that the respective directory is included within the view, then it may be determined whether an include rule or an IDO rule has been specified for the respective directory. This determination may impact how to determine whether to include the directory's child elements in the view, as described in more detail below. For example, if it is determined that an include rule is specified for the parent directory for the queried stream at the queried time, then the parent I/E flag may be set equal to a value representing "include," such that child elements of the parent directory are included in the view, unless an overriding exclude rule is specified for the child element. Alternatively, if it is determined that an IDO rule is specified for the parent directory for the queried stream at the queried time, the parent I/E flag may be set equal to a value representing "IDO," such that child elements of the parent directory will not be included in the view, unless an include or IDO rule is specified for the child elements.

In some embodiments, for the outer loop performed for the queried directory, the parent I/E flag may be set to a value representing "include" by default. This default setting may be performed so that the child elements of the queried directory are to be included in the view unless an exclude rule is specified for the child elements.

If the query specified not to perform recursion on the query directory, then method 1400 may not include Act 1404, as the parent I/E flag would not be necessary.

In Act 1406, for the current directory, entries may be selected from a historical element location data structure, for example, data structure 1100 described above in relation to FIG. 11. In some embodiments, Act 1406 includes selecting an entry if the entry: specifies the queried stream or any of its ancestors; represents any time up until and including the queried time; and specifies that the current directory is a parent directory of the element represented by the entry.

Figure 15:
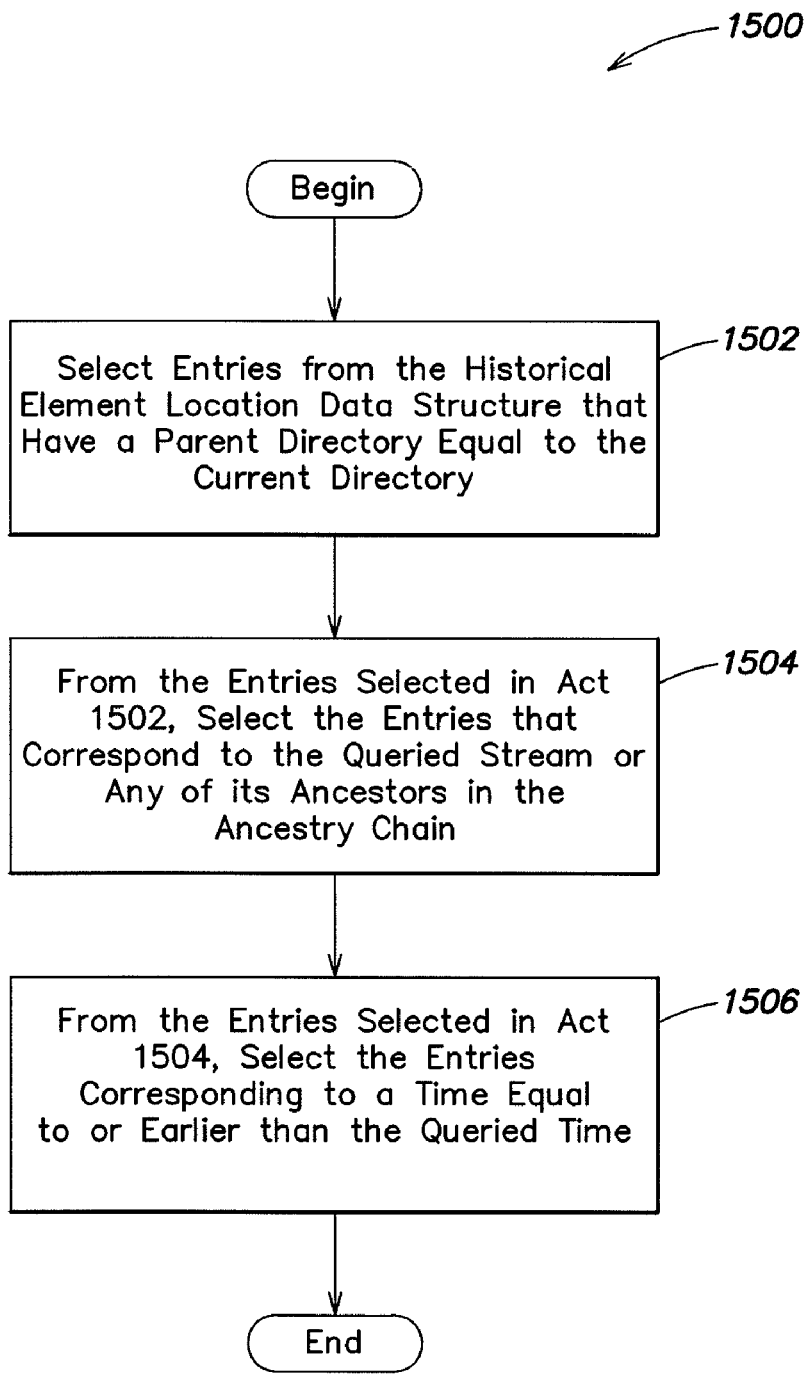
FIG. 15 is a flowchart illustrating an example of a method of selecting entries in a historical element location data structure.

Digressing briefly from method 1400, FIG. 15 is a flowchart illustrating an example of a method 1500 of selecting entries in a historical element location database. Method 1500 is merely an illustrative embodiment of a method of selecting entries in a historical element location database, and is not intended to the scope of the invention. Any of numerous other implementations of such a method, for example, variations of method 1500, are possible and are intended to fall within the scope of the invention.

In Act 1502, entries from the historical element location data structure that have a parent directory equal to the current directory may be selected. Act 1502 may include accessing parent EID field 1102 of each entry of data structure 1100. For example, if the parent directory is root directory 101 (EID=1), then Act 1502 may include selecting all entries from data structure 1100 having a parent EID equal to 1 (e.g., entries 1118 and 1122-1132).

In Acts 1504, from the entries selected in Act 1502, entries that correspond to the queried stream or any of its ancestors in the determined ancestry chain may be selected from the historical element location data structure, for example, data structure 1100. Act 1504 may include accessing the stream ancestry chain determined in Act 208 (e.g., in method 1300).

In an example where the queried stream is stream 210 (stream ID=3), Act 1504 may include selecting, from among entries 1118 and 1122-1132, entries that correspond to the queried stream 210 or any of its ancestor streams at the queried time. These ancestor streams include stream 206 (stream ID=2) and source stream 202 (stream ID=1). Accordingly, Act 1504 may include selecting entries 118, 1122 and 1126-1132 from among entries 1118 and 1126-1132. Entries 1122 and 1124 would not be selected because the stream ID field for each entry indicates a value of 5 representing stream 204, which is not in the ancestry chain of stream 210 at the queried time.

In Act 1506, from the entries selected in Act 1504, entries corresponding to a time equal to or earlier than the queried time may be selected, for example, from data structure 1100. For example, for a queried time corresponding to transaction 54 or later, all of the entries determined in Act 1504 (e.g., entries 1118 and 1126-1132) may be selected. As another example, if the queried time was a time corresponding to transaction 9, Act 1506 may select only entries 1118 and 1126, but not entries 1128-1132, which all have higher transaction numbers than transaction number 9.

It should be appreciated that if any of Acts 1502-1506 do not select at least one entry, then method 1500 ends, such that Act 406 selects no entries from the historical element location data structure.

Method 1500 may include additional acts. Further, the order of the acts performed as part of method 1500 is not limited to the order illustrated in FIG. 15, as the acts may be performed in other orders and/or one or more of the acts may be performed in parallel (at least partially).

Returning to method 1400, in Act 1408, it is determined whether any entries were selected in Act 1406. If no entries were selected, then method 1400 ends, in which case Act 1214 may display a view of the queried stream that does not include any software components.

If it is determined that entries have been selected in Act 1406, then in Act 1410, the entries selected in Act 1406 may be sorted. Act 1410 may include Acts 1412-1416 of: sorting the selecting entries by directory element; for each directory element, sorting by stream position within the determined ancestry chain; and, for each stream, sorting by time (e.g., transaction number). It should be appreciated that for any of acts 1412-1416, a data structure such as an index may be provided in which the selected entries are already presorted.

For example, if the queried directory is the root directory, the queried stream is stream 210 and the queried time is a time corresponding to transaction 54 or later, then Act 1410 may result in sorted data structure 1600 illustrated in FIG. 16.

Digressing briefly, again, from method 1400, FIG. 16 illustrates an example of a data structure 1600 including sorted element location information, for example, resulting from the performance of Act 1410. Data structure 1600 may include entries 1118, 1130, 1128, 1132 and 1126 from data structure 1100, and each entry may include the same fields 1102-1116 as data structure 1100, although it should be appreciated that data structure 1600 may include additional fields or less than all the field found in data structure 1100.

The entries of data structure 1600 may have been sorted into two groups, the first group including entry 1118 for directory 102 (EID=2), and the second group including entries 1130, 1128, 1132 and 1126 for file 106 (EID=4). It should be appreciated that the order in which the sorted groups appear may be different than that illustrated in FIG. 16. For example, the entries of group 2 may be listed before entry 1118 (i.e., group 1).

Within each group, the entries may be sorted by stream position within the ancestry chain, for example, from lowest position to highest position. Ordering from lowest position to highest position reflects that, for a given element, entries for streams of lower position in the ancestry chain may take precedence over entries for streams of higher position in determining the contents of a view. Accordingly, entries 1130 and 1128 corresponding to stream 210 (stream ID=3) may be listed first, followed by entry 1132 corresponding to stream 206 (stream ID=2), followed by entry 1126 corresponding to stream 202 (stream ID=1).

From among the entries corresponding to a same element and stream, the entries may be sorted by time (e.g., by transaction number) for example, highest transaction number to lowest transaction number. Such ordering reflects that, for a given element and stream, more recent transactions may take precedence over earlier transactions in determining the contents of a view. For example, entry 1130 may be listed before entry 1128 because 1130 resulted from transaction 11, which is higher than transaction 10 from which entry 1128 resulted.

Returning to method 1400, in Act 1418, for each directory element of the sorted entries, it may be determined whether the directory element was included in the view of the current directory for the queried stream at the queried time. In some embodiments, Act 1418 includes the performance of method 1700, described below in relation to FIG. 17.

Method 1400 may include additional acts. Further, the order of the acts perform this part of method 1400 may be not be limited to the order illustrated in FIG. 14, as the acts may be performed in other orders and/or one or more of the acts may be performed in parallel (at least partially).

Figure 17A:
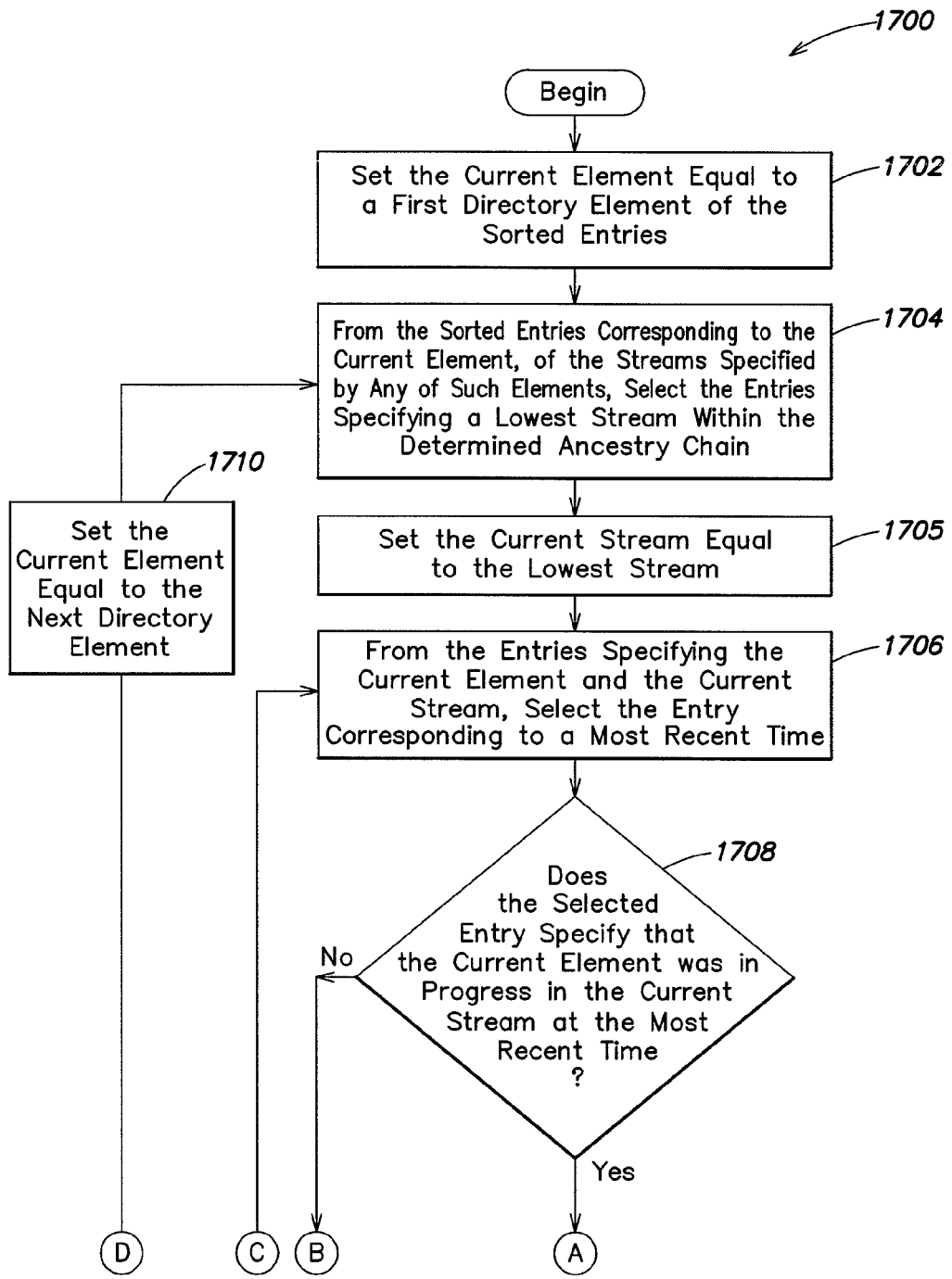
FIGS. 17A and 17B illustrate an example of a method of determining whether a directory element was included in a view of a directory for a stream at a time.
Figure 17B:
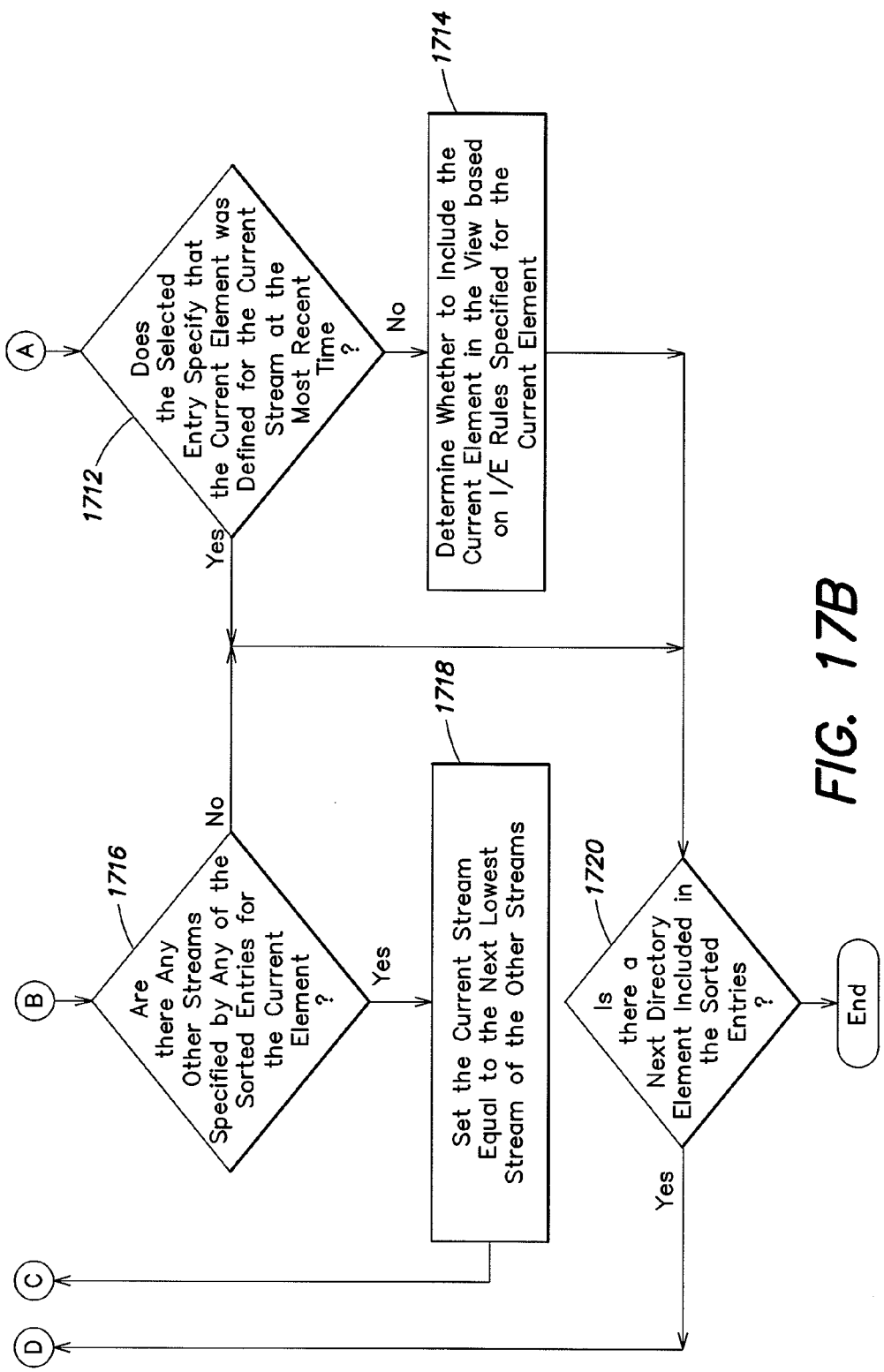

FIG. 17 illustrates an example of a method 1700 of determining whether a directory element was included in a view of a directory for a queried stream at a queried time. Method 1700 is merely an illustrative embodiment of a method of determining whether a directory element was included in a view of a directory for a queried stream at a queried time, and is not intended to limit the scope of the invention. Any of numerous other implementations of such a method, for example, variations of method 1700, are possible and are intended to fall within the scope of the invention.

In Act 1702, the value of a variable representing a current element may be said equal to a first directory element of the sorted entries. Act 1702 may include setting the current element variable equal to the EID in the EID field 1110 of a first entry (e.g., entry 1118 or 1130) of data structure 1600 for the current element. As will be described below, method 1700 may include looping through each directory element of the sorted entries. For the entries illustrated in data structure 1600, this looping may include looping through entries in data structure 1600 for directory elements 102 (EID=2) and 106 (EID=4).

In Act 1704, from the sorted entries corresponding to the current element, the entries specifying a lowest stream within the determined ancestry chain (of the streams specified by any of the sorted elements) may be selected. For example, if the current element is element 106 (EID=2), then Act 1704 may select sorted entries for element 106 that specify stream 210 (stream ID=3). These selected entries may include entries 1130 and 1128. In Act 1705, a value of a current stream variable may be set equal to a value of the lowest stream determined as part of Act 1704.

In Act 1706, from the entries specifying the current element and the current stream, the entry corresponding to a most recent time (e.g., specifying a highest transaction number) may be selected. For example, if the current element is file 106 and the current stream is stream 210, then Act 1706 may include selecting entry 1130 from data structure 1600 because entry 1130 has a transaction number (11) that is higher than the transaction number (10) specified by entry 1128.

In Act 1708, it may be determined whether the selected entry specifies that the directory element was in progress in the current stream at the most recent time (i.e., the time corresponding to the entry selected in Act 1706). Act 1708 may include accessing the in-progress field 1116 of the selected entry. For example, if the selected entry is entry 1130, then Act 1708 may determine that file 106 was in progress for stream 210 at the most recent time.

In some embodiments, if a current element is not in progress for a current stream at a most recent time, then whether the current element is included in the stream (not to be confused with determining whether it is included within the view of the stream) at the most recent time may be determined based on one of the stream's ancestors. Accordingly, if it is determined in Act 1708 that the current element was not in progress in the current stream at the most recent time, then it may be determined in Act 1716 whether there are any other streams specified by any of the sorted entries for the current element (which, from the method by which they were selected would be streams included in the ancestry chain).

If there are such streams, then, in Act 1718, the current stream variable may be set equal to the next lowest stream of the other streams specified by any of the sorted entries, and method 1700 may return to Act 1706. In other words, if the current element is not in progress for the current stream at the most recent time, it may be determined whether the sorted entries include entries specifying any other streams of the determined ancestry chain. If there are such streams, then the method returns to Act 1706 to select an entry corresponding to a most recent time. For example, if entry 1130 had a value equal "0," then Acts 1716, 1718 and 1706 may result in the current stream being set equal to stream 206 (EID=2) specified by entry 1132.

If it is determined in Act 1716 that there are not any other streams specified by any of the sorted entries for the current element, then in Act 1720, it may be determined whether there is a next directory element included in the sorted entries. In other words, if it is determined in Act 1716 that no other streams are specified by any of the entries for the current element, then the entry was not included in the queried stream at the queried time. Accordingly, method 1700 may move on to Act 1720, in which it may be determined whether there are any other directory elements to consider for inclusion.

If it is determined that there is a next directory element included in the sorted entries, then in Act 1710, the current element variable may be set equal to the next directory element, for example, the next directory element specified by one of the entries in data structure 1600. For example, if the selected entry was entry 1118 (EID=2) for element 102 and in-progress field 1116 holds a value "0," then Acts 1720 and 1710 may result in the current element being set equal to element 106 (EID=4) specified by entry 1130.

After performance of Act 1710, method 1700 may proceed to Act 1704 and the loop may repeated for the new current element.

Returning to Act 1708, if it is determined that the current element was in progress in the current stream at the most recent time, then it may be determined in Act 1712 whether the selected entry specifies that the directory element was defunct for the current stream at the most recent time. Act 1712 may include accessing field 1112 of data structure 1600 for the selected entry. For example, if the selected entry is 1130, then Act 1712 may include determining that element 106 is defunct for stream 210 at the most recent time.

If the current element for the current stream is determined to be defunct at the most recent time, then the current element was not included in the queried stream at the queried time, let alone the view of the queried stream. Accordingly, the method may not proceed to Act 1714. In such cases, method 1700 may proceed to Act 1720 and search for a next directory element of the sorted entries.

If it is determined in Act 1712 that the current element was not defunct (i.e., was included) for the current stream at the most recent time, then in Act 1714, it may be determined whether to include the current element in the view of the current stream based on I/E rules specified for the current element at the queried time.

It may be desirable to include an element in a view of a stream even if the element is defunct in the stream. For example, a user may have removed an element in a workspace, but not yet promoted this modification to its parent stream. If the defunct element is not included within the workspace view, then the user may forget that he/she removed the element and inadvertently promote the defunct element to its parent stream without carefully considering the ramifications of doing so. Accordingly, in some embodiments, an element removed from a view of a stream may still be included in the view until the stream is promoted to its parent stream. Accordingly, in some embodiments, Act 1712 may not be included in method 1700, and Act 1714 may be performed as a result of a positive determination in Act 1708.

In alternative embodiments, a removed element is included in a view of the stream until the stream is promoted only if the stream is a workspace. In such alternative embodiments, method 1700 may include an additional step between Acts 1708 and 1712 of determining whether the current stream is a workspace. In such embodiments, if the stream is a workspace, then whether or not the current element is defunct may be considered irrelevant in determining whether to include the element in the view, and the method may proceed to Act 1714. If it is determined that the stream is not a workspace, then the method may proceed to Act 1712.

As described above, in some embodiments of the invention, Acts 1210 and 1212 are performed as independent, decrete acts. In such embodiments, Act 1210 may include Acts 1402, 1406-1410, Acts 1702-1712 and Acts 1716-1720. Further, if in Act 1712 it is determined that the current element was not defunct for the current stream at the most recent time, then the inclusion of the current element in the current stream at the most recent time may be recorded. In other words, the eligibility of the current elements to be included in the queried stream at the queried time may be recorded. Further, it may be determined whether the query specifies recursion and whether the current element is a directory. If both determinations are positive, then the directory elements included in the view for the current element and its descendant elements for the queried stream at the queried time may be determined. For example, Acts 1402, 1406-1410, 1702-1712 and 1716-1720 may be performed for the current element. Thus, it should be appreciated that Act 1212 may include the performance of nested loops, an outermost loop being the loop performed for the queried directory, and the inner loops being loops performed for descendant elements of the queried directory.

Returning to FIG. 17B, after determining whether to include the current element in the view based on I/E rules specified for the current element, method 1700 may proceed to Act 1720.

Method 1700 may include additional acts. Further, the order of the acts performed as part of method 1700 may not be limited to the order illustrated in FIG. 17, as the acts may be performed in other orders and/or one or more of the acts may be performed in parallel (at least partially).

Figure 18A:
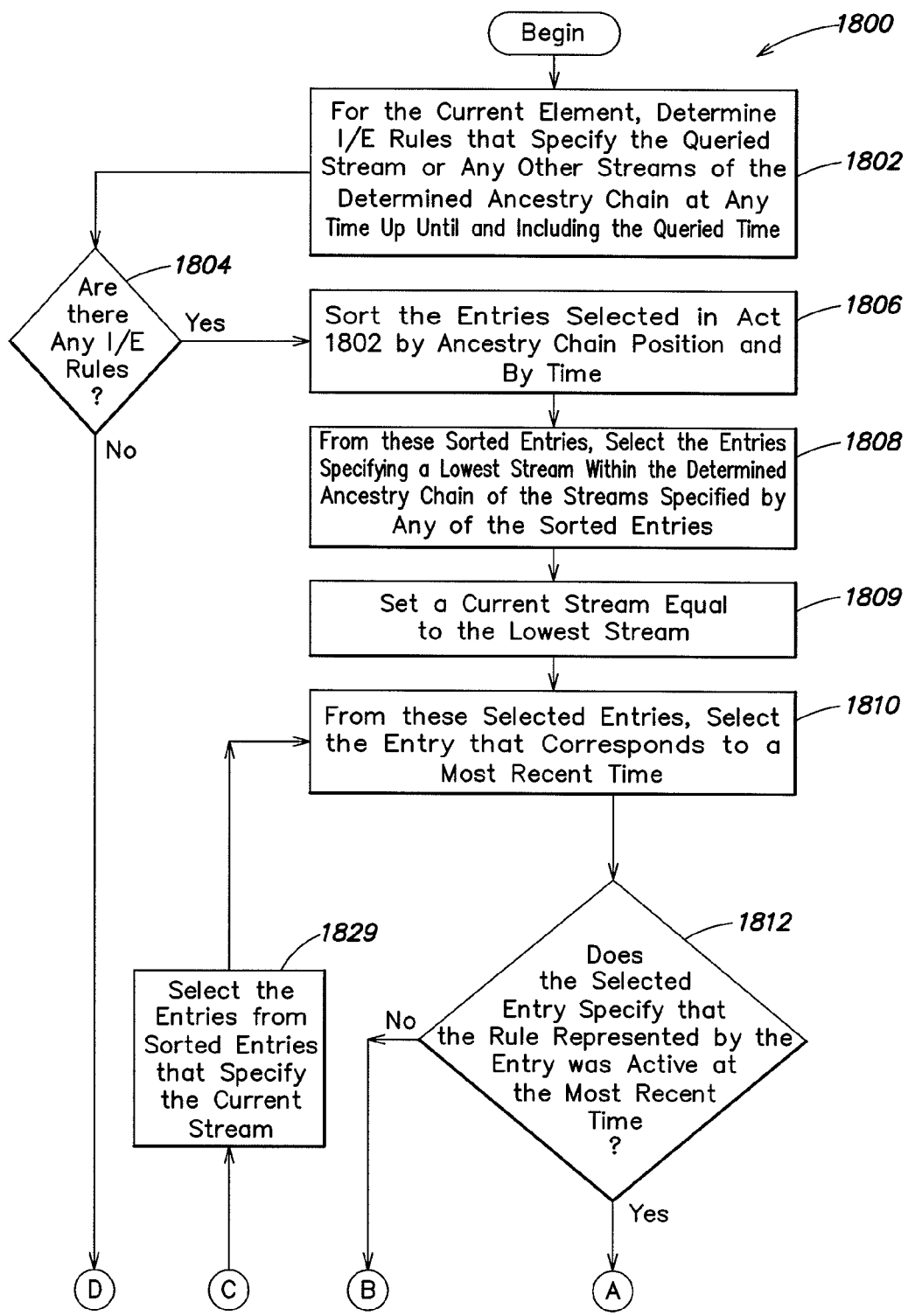
FIGS. 18A and 18B comprise a flowchart illustrating an example of a method of determining whether to include an element in a view, based on I/E rules specified for the element.
Figure 18B:
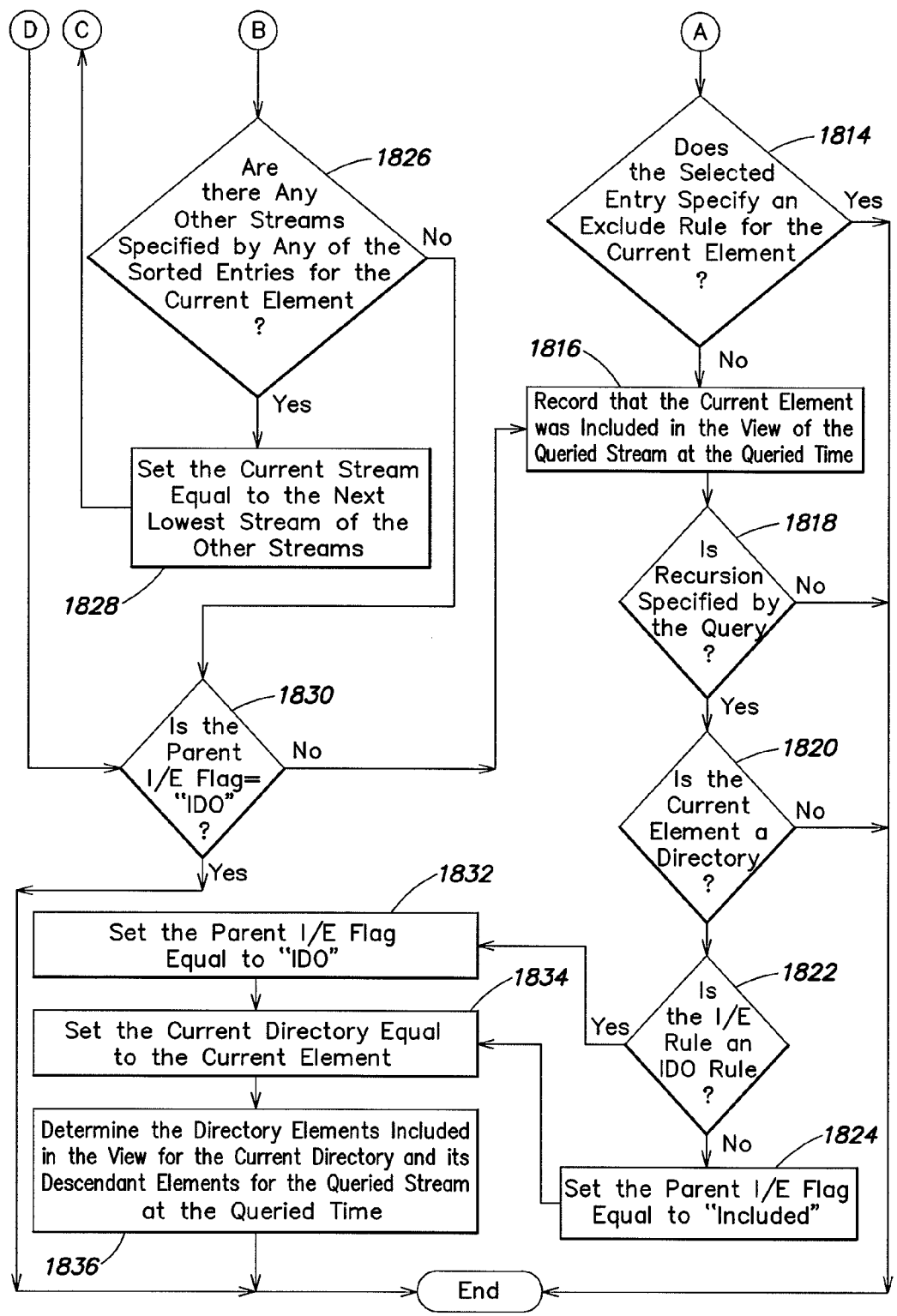

FIGS. 18A and 18B comprise a flowchart illustrating an example of a method 1800 of determining whether to include an element in a view, based on I/E rules specified for the elements. Method 1800 may be performed as part of Act 1714. Method 1800 is merely an illustrative embodiment of a method of determining whether to include an element in a view, based on I/E rules specified for the elements, and is not intended to limit the scope of the invention. Any of other numerous limitations of such a method, for example, variations of method 1800, are possible and are intended to fall within the scope of the invention.

In Act 1802, for the current element, I/E rules that were specified for the queried stream or any other streams of the determined ancestry chain at any time up until and including the query time may be determined. Act 1802 may include accessing a historical I/E rules data structure, for example, data structure 900 described above in relation to FIG. 9. Act 1802 may include method 1900 described below in relation to FIG. 19.

Figure 19:
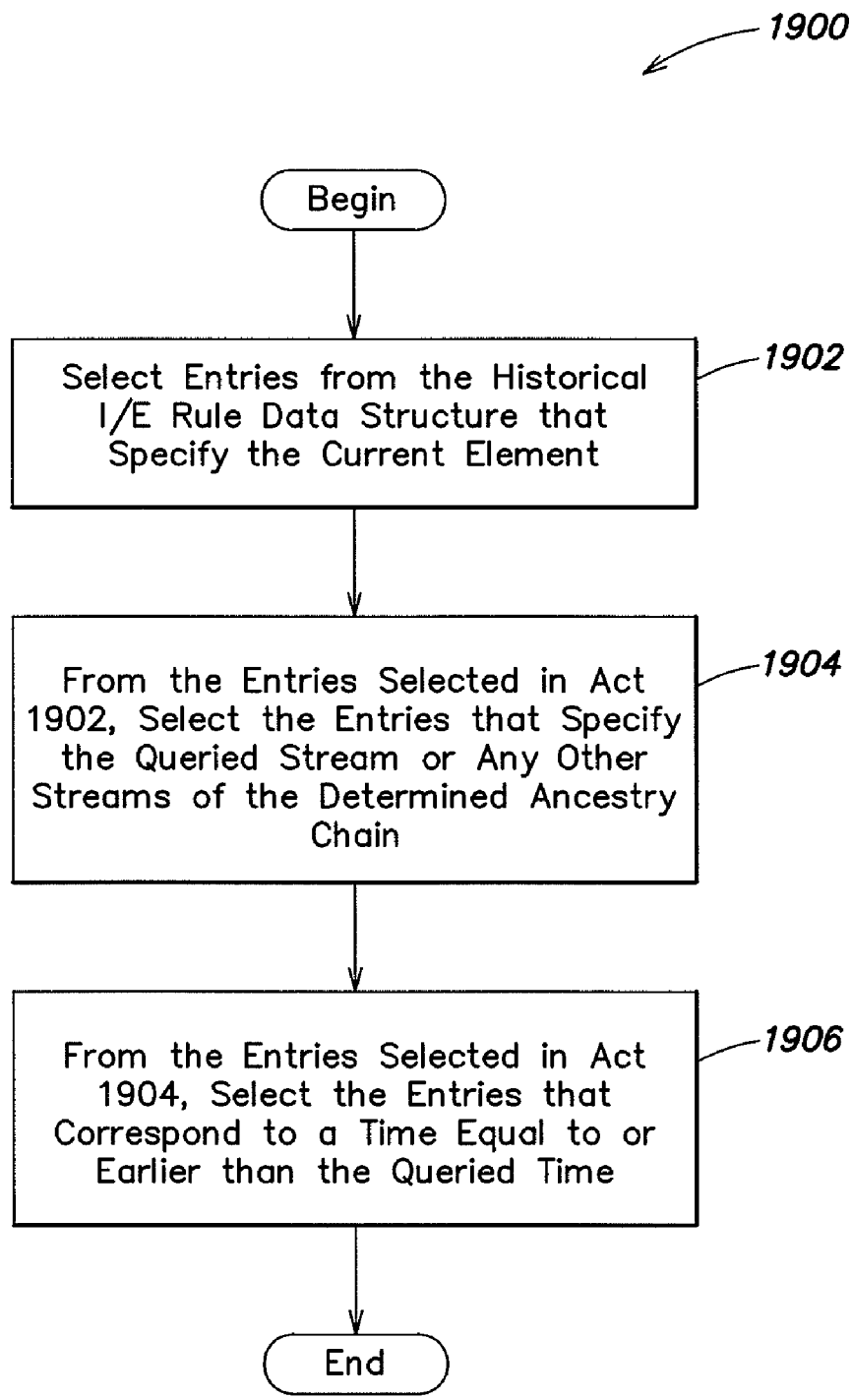
FIG. 19 is a flowchart illustrating an example of a method of selecting entries in a historical I/E rules data structure.

Digressing briefly from method 1800, FIG. 19 is a flowchart illustrating an example of a method 1900 of selecting entries from a historical I/E rules data structure, for example, data structure 900. Method 1900 is merely an illustrative embodiment of a method of selecting entries from a historical I/E rules data structure, and is not intended to be limiting. Any of numerous other implementations of such a method, for example, variations of method 1900, are possible and are intended to fall within the scope of the invention. Further, method 1900 may include additional acts beyond those discussed below.

In Act 1902, entries from the historical I/E rules data structure that specified the current element may be selected. For example, if the current element is element 124 (EID=7), then Act 1902 may include selecting entries 912, 916 and 918 from data structure 900.

In Act 1904, from the entries selected in Act 1902, entries that specify the queried stream or any other streams of the determined ancestry chain may be selected. For example, if the queried stream is stream 210 (stream ID=3), then Act 1904 may include selecting entries 912, 916 and 918 from entries 912, 916 and 918, as all of these entries specify a stream ID of 2 (stream 206) or 3 (stream 210), both of which are in the determined ancestry chain of stream 210 at the queried time.

In Act 1906, from the entries selected in Act 1904, entries that correspond to a time equal to or earlier than the queried time may be selected. For example, if the queried time is a time corresponding to transaction 54 or any time thereafter, entries 912, 916 and 918 may be selected from among 912, 916 and 918. In another example, if the queried time was a time between the time corresponding to transaction number 51 and transaction number 52, Act 1906 would only return entries 912 and 916.

Returning to method 1800, in Act 1804, it is determined whether Act 1802 determined any I/E rules that specified a queried stream or any other streams of the determined ancestry chain at any time up until and including the queried time.

If the determination of Act 1804 is positive, then in Act 1806, the entries determined in Act 1802 are sorted by ancestry chain position (e.g., from lowest link in the chain to highest link) and by time (e.g., from highest transaction number to lowest transaction number). For example, if Act 1802 selected entries 912, 916 and 918 from data structure 900, these entries may be sorted in the following order: 1918; 1916; and 1912.

In Act 1808, from these sorted entries, select the entries specifying a lowest stream within the determined ancestry chain of the streams specified by any of the sorted entries. For example, from sorted entries 918, 916 and 912, entry 918 (stream ID=3) may be selected. In Act 1809, a current stream variable may be set equal to the lowest stream determined in Act 1808. For example, the current stream variable may be set equal to 3 (stream 210).

In Act 1810, from the entries selected in Act 1808, select the entry that corresponds to a most recent time (e.g., a highest transaction number). For example, if the selected entry is entry 918, then this is the entry selected in Act 1810. In another example, if Act 1808 selected entries 912 and 916, then Act 1810 may select entry 916, which corresponds to a most recent time (e.g., the time corresponding to transaction number 51).

In Act 1812, it may be determined whether the selected entry specifies that the rule specified by the entry was active at the most recent time. For example, Act 1812 may include accessing active field 908 of the selected entry from data structure 900. For example, if the select entry is entry 918, then Act 1812 may determine that the rule specified by entry 918 is active. As another example, if the selected entry is entry 916, then Act 1812 may determine that the rules specified by entry 916 is not active because the active field holds a value equal "0".

If it is determined in Act 1812 that the rule represented by the selected entry is active, then in Act 814 it may be determined whether the selected entry specifies an exclude rule for the current element. If the selected entry does specify an exclude rule, then method 1800 ends and the current element will not be included in the view.

If it is determined that the selected entry does not specify an exclude rule, then in Act 1816, the fact that the current element was included in the view of the queried stream at the queried time may be recorded. For example, in a temporary data structure. In some embodiments, concurrently to the remainder of method 1800 and/or method 1200 being performed, an indication that the current element is included in the view may be displayed by a user interface. For example, an indication of the current element may be displayed within directory element panel 404 of U400, described in more detail above in relation to FIGS. 4-8.

Returning to Act 1812, if it is determined that the selected entry does not specify that the rule represented by the selected entry was active at the most recent time (i.e., the time corresponding to the selected entry), then method 1800 may proceed to Act 1826. In Act 1826, it may be determined whether there are any other streams specified for any of the sorted entries for the current element. Thus, because the most recent entry for the current stream was inactive, method 1800 next checks whether any of its ancestors in the ancestry chain specify an active I/E rule for the current element. If there are any other such streams, then in Act 1828, the current stream variable is set equal to the next lowest stream of the other streams.

In Act 1829, the entries from the sorted entries that specify the current stream, and in Act 1810, select the entry that corresponds to a most recent time from these selected entries. For example, if entry 918 had an active field 908 equal to "0" indicating that the rule represented by entry 918 was inactive at the time corresponding to transaction number 52, then, as a result of acts 1826, 1828, 1829 and 1810, entry 912 may be selected.

If it is determined in Act 1826 that there are not any other streams specified by any of the sorted entries for the current element, then method 1800 proceeds to Act 1830. Further, returning to Act 1804, if it is determined in Act 1802 that for the current element, there are no I/E rules that specify the queried stream or any other streams of the determined ancestry chain at any time up until and including the queried time, then method 1800 proceeds to Act 1830. Thus, Act 1830 is arrived at in method 1800 if no I/E rule is found for the current element for the queried stream at a time up to or including the queried time.

As described above, a parent I/E flag is initialized to "include" in Act 1404. However, in other inner loops within method 1400, the I/E flag may be set equal to "IDO". The value of parent I/E flag is equal to a value of the I/E rule (if any, otherwise the value will be set to "include") of the parent directory of the current directory for the queried stream at a time up until or including the queried time.

In Act 1830, it is determined whether the I/E flag equals "IDO". If the parent I/E flag is equal to "IDO," and method 1800 ends and the current element is not included in the view of the queried stream. Method 1800 ends and the current element is not included in the view because if I/E flag equal "IDO," this means that the I/E rule for the parent directory specified that the directory was included in the view of the queried stream at the queried time, but none of the parent directory's children, unless an include rule or IDO rule is specified for the child for the queried stream at the queried time. Accordingly, because Act 1830 was reached because the current element (i.e., the child element of the parent directory) did not have an active rule for the queried stream at the queried time, the current element is excluded from the view.

If it is determined in Act 1830 that the parent I/E flag is not equal "IDO," then method 1800 proceeds to Act 1816, which is also arrived at if the determination in Act 1814 is negative.

In Act 1816 it may be recorded that the current element was included in the view of the queried stream at the queried time. For example, the current element's inclusion in the view may be recorded in a temporary data structure. Further, the current elements may be displayed in a view of the queried stream as performance of method 1400 continues.

In Act 1818, it may be determined whether recursion was specified by the query. If recursion was not specified, then method 1800 may end. If recursion is specified by the query, then in Act 1820, it may be determined whether the current element is a directory. If the current element is not a directory, then method 1800 may end. If it is determined that the current element is a directory, then an act 1822, it may be determined whether the I/E rule specified for the current element is an IDO rule. If the I/E rule is an IDO rule, then the parent I/E flag may be set equal to "IDO." If the I/E rule is not an IDO rule, then the I/E rule is an include rule (at this point of method 1800, the current rule cannot be an exclude rule). Accordingly, in Act 1824, the parent I/E flag may be set equal to "included." After the performance of either act 1832 or 1824, the current directory variable may be set equal to the current element.

Acts 1824, 1832 and 1834 may be performed in preparation for descending into an inner loop if the current element is a directory. Thus, if the current element specifies an include rule, then each of its child elements will be included in the view, unless the child element specifies an exclude rule. Accordingly, in this scenario, the parent I/E flag is set equal to "included." If the current I/E rule specifies an IDO rule, then each of the child elements of the current element will not be included within the view unless an include rule or IDO rule is specified for the child's stream at the queried time. Accordingly, in this scenario, the parent I/E flag is set equal to "IDO."

In Act 1836, the directory elements included in the view for the current directory and its descendant elements for the queried stream at the queried time may be determined. Thus, one or more inner loops may be performed for the current directory and its descendant elements, for example, including acts similar to or the same as the acts of method 1400. It should be appreciated that as method 1400 descends into each child loop, for example, in performance of Act 1836, the variables of the parent loop may be maintained so that the parent loop may be completed when the method returns from the child loop.

Method 1800 may include additional acts. Further, the order of the acts performed as part of method 1800 is not limited to the order illustrated in FIG. 18, as the acts may be performed in other orders and/or one or more of the acts may be performed in parallel (at least partially).

Methods 300, 1200, 1300, 1400, 1500, 1700, 1800 and 1900, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of any of systems 149, 2000 and 2100 described herein, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 21 and 22, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Having now described user interfaces, data structures, and methods for specifying I/E rules for a view and for determining the software components included in a view of a stream at a particular time, a system for implementing these components will now be described.

FIG. 20 is a block diagram illustrating an example of a system 2000 for specifying I/E rules for a view and for determining the software components included in a view of a stream at a particular time. System 2000 is merely an illustrative embodiment of a system for specifying I/E rules for a view and for determining the software components included in a view of a stream at a particular time, and is not intended to limit the scope of the invention. Any of numerous other implementations of such a system, for example, variations of system 2000, are possible and are intended to fall within the scope of the invention.

System 2000 may be an example of system 149 described above in relation to FIG. 1, and may include any of a stream view engine 150, historical development project database 152 and user output device 2006. Stream view engine 150 may include any of user input interface 2016, user output interface 2042, I/E rules generator 2044, stream hierarchy generator 2030, view contents generator 2036 and stream contents generator 2034. Input interface 2016 and output interface 2042 may be included in user interface 151 described above in relation to FIG. 1, which may provide the GUI displays described in relation to FIG. 2 and FIGS. 4-8.

User input interface 2016 may be configured to receive any of stream value 2008 (e.g., a stream ID), a directory value 2010 (e.g., an EID), an I/E rule 2012, and a recursion indicator 2015. The user interface 2016 then may forward these values (perhaps represented in another form) and transaction number 2024 to I/E rules generator 2044. For example, the user interface 151 may receive values 2008-2012 from a user through GUI display 200, content view 400 or 400' and/or any of I/E views 500' or 500". Transaction number 2024 may be automatically generated by a transaction number generator (e.g., not shown) and input to I/E rules generator 2044. The transaction number generator may be configured to determine a next available transaction number to assign to a transaction by accessing a transaction data structure (not shown, but described above).

Based on values 2008-2012 and transaction number 2024, I/E rules generator may be configured to generate a historical I/E rules entry 2046, and store it in historical I/E rules data structure 2048 of data base 152. Data structure 2048 may be configured similar to or the same as data structure 900 described above in relation to FIG. 9. I/E rules generator 2044 may be configured to perform method 300 described above in relation to FIG. 3.

The ancestry chain generator 2030 may receive stream value 2008 and transaction number 2028. Generator 2030 may receive stream value 2008 and transaction number 2028 in response to a user selecting a stream, for example, from GUI display 200. The transaction number 2028 may have been generated by the transaction number generator (not shown) based on a user-supplied time/transaction number value 2014. Alternatively, if no time value or transaction value was provided, the generator may determine a highest transaction number (i.e., a transaction number representing a most recent time) from a transaction number data structure (not shown) in database 152.

User input interface 2016 may be configured to pass the stream value 2008 to ancestry chain generator 2030, which may be configured to generate ancestry chain 2032. Ancestry chain generator may be configured to perform method 1300 to generate ancestry chain 2032 and to send ancestry chain 2032 to stream contents generator 2034 and view contents generator 2036. Generator 2030 may be configured to access one or more entries of historical stream hierarchy data structure 2050, which may configured similar to or the same as data structure 1000 described above in relation to FIG. 10.

Stream contents generator 2034 may be configured to receive ancestry chain 2032, transaction number 2028, directory value 2010 and recursion indicator 2015, for example, in response to a user selecting a directory element from directory element panel 404 of content view 400 or 400'. Generator 2034 may be configured to determine stream contents 2038 of the stream specified by stream value 2008 for the directory specified by the directory value 2010. Generator 2034 may be configured to determine stream contents recursively, for example, if specified by indicator 2015, or by default if no recursion indicator is provided. Alternatively, generator may be configured to not perform recursion by default.

Stream contents generator 2034 may be configured to perform parts of method 1200, for example, acts 1210, 1402-1410, 1702-1712 and 1716-1720. To generate stream contents 2038, generator 2034 may be configured to access one or more entries in historical elements location data structure 2052, which may be configured similar to or the same as data structure 1100 described above in relation to FIG. 11.

View contents generator 2036 may be configured to receive transaction number 2028, ancestry chain 2032 and stream contents 2018, and to generate view contents 2040. Generator 2036 may be configured to access one or more entries of historical I/E rules data structure 2048, which may configured similar to or the same as data structure 900 described in relation to FIG. 9. Further, generator 2036 may be configured to send view contents 2040 to user output interface 2042, which may configured to provide a user interface display on user output device 2006, for example, any of GUI displays 200, 400, 400', 500, 500' and 500". Generator 2036 may be configured to perform parts of method 1200, for example, Act 1212, Act 714 and method 1800.

User output interface 2042 may receive the view contents 2040 and control a user output device 2006 to provide a user interface display, for example, any of GUI displays 200, 400, 400', 500, 500' and 500". User output interface 2042 may be configured to implement Act 1214 of method 1200, and in some embodiments, may implement Act 1214 concurrently to the performance of Acts 1210 and/or 1212.

Any of components of system 2000, including stream view engine 2000 and components 2016, 2004, 2030, 2034 and 2036 thereof, may be configured (e.g., programmed) using any of a variety of techniques. In some embodiments, one or more parameters or functionality of a component may be configured to exhibit permanent behavior by a programmer. For example, the system may be configured such that, after it is installed at a customer site, it cannot be altered by a programmer by altering program code or by any other means.

In some embodiments, one or more parameters or functionality of a component may be dynamically programmable by a programmer after the system has been installed. For example, the component may provide one or more programming "hooks" that enable a programmer to program functionality of the component by manipulating program code (e.g., through one or more APIs) and/or that enable a user to program functionality using high-level scripts.

In some embodiments, one or more parameters or functionality of a component may be dynamically programmable by a user without resort to program code or scripts after the system has been installed. For example, a user interface such as any of those described herein may enable a user to program functionality, for example, by providing values for certain parameters. For example, a user may be enabled to program the stream contents generator 2034 to perform recursion by default.

Any of the components of system 2000 may be configured (using any combination of the above techniques) to exhibit default behavior. For example, the view contents generator 2036 and the stream contents generator may be configured to perform (or not perform) recursion by default, and to use a current time as the queried time by default. It should be appreciated that any of the components of system 2000 may be configured with any suitable functionality described herein, including default functionality.

System 2000, and components thereof may be implemented using software (e.g., C, C#, C++, Java, or a combination thereof), hardware (e.g., one or more application-specific integrated circuits), firmware (e.g., electrically-programmed memory) or any combination thereof. One or more of the components of system 2000 may reside on a single device (e.g., a computer), or one or more components may reside on separate, discrete devices. Further, each component may be distributed across multiple systems, and one or more of the systems may be interconnected.

Further, on each of the one or more devices that include one or more components of system 2000, each of the components may reside in one or more locations on the system. For example, different portions of the components may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to create one or more I/E rules and to determine software components included in a view of a stream at a particular time, according to any embodiments described above.

A general-purpose computer system, according to some embodiments of the invention, is configured to perform the methods described above or portions thereof. It should be appreciated that the system may perform other functions, and the invention is not limited to having any particular function or set of functions.

For example, various aspects of the invention may be implemented as specialized software executing in a general-purpose computer system 2100 such as that shown in FIG. 21. The computer system 2100 may include a processor 2103 connected to one or more memory devices 2104, such as a disk drive, memory, or other device for storing data. Memory 2104 is typically used for storing programs and data during operation of the computer system 2100. Components of computer system 2100 may be coupled by an interconnection mechanism 2105, which may include one or more busses (e.g., between components that are integrated within a same machine) and/or a network (e.g., between components that reside on separate discrete machines). The interconnection mechanism 2105 enables communications (e.g., data, instructions) to be exchanged between system components of system 2100. Computer system 2100 also includes one or more input devices 2102, for example, a keyboard, mouse, trackball, microphone, touch screen, and one or more output devices 2101, for example, a printing device, display screen, speaker. In addition, computer system 2100 may contain one or more interfaces (not shown) that connect computer system 2100 to a communication network (in addition or as an alternative to the interconnection mechanism 2105.

The storage system 2106, shown in greater detail in FIG. 22, typically includes a computer readable and writeable nonvolatile recording medium 2201 in which signals are stored that define a program to be executed by the processor or information stored on or in the medium 2201 to be processed by the program. The medium may, for example, be a disk or flash memory. Typically, in operation, the processor causes data to be read from the nonvolatile recording medium 2201 into another memory 2202 that allows for faster access to the information by the processor than does the medium 2201. This memory 2202 is typically a volatile, random access memory such as a dynamic random access memory (DRAM) or static memory (SRAM). It may be located in storage system 2106, as shown, or in memory system 2104, not shown. The processor 2103 generally manipulates the data within the integrated circuit memory 2104, 2202 and then copies the data to the medium 2201 after processing is completed. A variety of mechanisms are known for managing data movement between the medium 2201 and the integrated circuit memory element 2104, 2202, and the invention is not limited thereto. The invention is not limited to a particular memory system 2104 or storage system 2106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2100 is shown by way of example as one type of computer system upon which various aspects of the invention may be practiced, it should be appreciated that aspects of the invention are not limited to being implemented on the computer system as shown in FIG. 21. Various aspects of the invention may be practiced on one or more computers having a different architecture or components that that shown in FIG. 21.

Computer system 2100 may be a general-purpose computer system that is programmable using a high-level computer programming language. Computer system 2100 may be also implemented using specially programmed, special purpose hardware. In computer system 2100, processor 2103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX or LINUX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the method enabling recreation of a previous display of a subset of software components of a first version of the software development project by determining software components that were included in a first view of the first version at a first time, the method comprising acts of:

(A) accessing a data structure that represents a history of views of versions of the software development project included in the hierarchy to determine at least one instruction specifying whether a first software component was to be displayed in a listing of contents of the first version at the first time, where the first software component was included in the first version at the first time, wherein (i) the hierarchy includes a second version higher than the first version in the hierarchy and the first version is configured to inherit properties of the second version and (ii) accessing a data structure includes accessing a first entry of the data structure, the first entry specifying a second time and specifying whether the first software component was included, at the second time, in the first view or in a second view of another version of the software development project from which the first version inherits properties; and (B) if it is determined that the first software component was included in the first view at the first time, displaying the first software component in a display of the subset of software components in the first version, and displaying the first software component in the display if the first entry specifies that the first software component was included in the first or second view at the second time.

2. The method of claim 1, wherein the second time is equal to the first time.

3. The method of claim 1, wherein the second time is earlier than the first time.

4. The method of claim 1, wherein the data structure includes a second entry specifying a third time different than the second time and specifying whether the first software component was included, at the third time, in the first view of the first version or a view of another version of the software development project from which the first version inherits properties, and wherein the act (A) includes accessing the second entry.

5. The method of claim 4, wherein the second entry specifies the first version and wherein the third time is earlier than the second time, and wherein the act (A) comprises giving precedence to the first entry over the second entry in determining whether to include the first software component in the first view.

6. The method of claim 4, wherein the hierarchy includes a third version of the software development project that is derived from the second version and configured to inherit properties of the second version, the first version is configured to inherit properties of the third version such that the first version is lower in the hierarchy than the third version, the first entry specifies whether the first software component was included in the first view at the second time, the second entry specifies whether the first software component was included in a view of the third version at the third time, and wherein the act (A) comprises giving precedence to the first entry over the second entry in determining whether to include the first software component in the first view.

7. The method of claim 1, wherein the act (A) comprises and act of (1) selecting entries in the data structure that specify: the first software component, the first version or a version in the hierarchy from which the first version inherits properties, and a time earlier than or equal to the first time.

8. The method of claim 7, wherein the act (A) further comprises acts of (2) initialize a looping variable equal to a lowest named set specified by any of the entries determined in the act (A)(1), (3) from the entries determined in the act (A)(1) that specify a named set equal to the looping variable, determine an entry specifying a most recent time, (4) determine whether the entry determined in the act (A) (3) includes an indication of whether to include the first software component in a version of the software development project, (5) if the entry determined in the act (A)(3) does not include the indication, and there is a next lowest named set specified by any of the entries determined in the act (A)(1), set the looping variable equal to the next lowest named set, and (6) if the entry determined in the act (A)(3) includes the indication, basing the determination of whether to include the first software component in the first view on the entry determined in the act (A)(3).

9. The method of claim 8, further comprising an act of:

(C) receiving a query specifying the first time and the first version, wherein the acts (A) and (B) are performed in response to the act (C).

10. The method of claim 1, wherein the act (A) comprises accessing an entry in the data structure that comprises:

an element identifier specifying the first software component;

a version identifier specifying the first version;

a time-based identifier representing a second time equal to or earlier than the first time; and an inclusion/exclusion indicator specifying whether the first software component was included in the first version at the second time.

11. The method of claim 1, wherein the first software component is a file.

12. The method of claim 1, wherein the first software component is a directory of files.

13. The method of claim 1, wherein the first version is a workspace of a user.

14. A computer-readable storage medium having stored thereon a plurality of computer-readable signals defining a data structure corresponding to a software project represented by a hierarchy of versions of a software project, each version comprising a set of software components and corresponding to one or more users of a software configuration management application executed on at least one processor, the application supporting creation of views of a version to display subsets of the software components of the version, each view defining, at a particular time, an associated subset of software components included in the view such that modifications of definitions of the view over time result in modifications of the associated subset, the computer-readable storage medium comprising executable instruction to perform the acts of:

(A) accessing a data structure that represents a history of views of versions of the software development project included in the hierarchy to determine at least one instruction specifying whether a first software component was to be displayed in a listing of contents of the first version at the first time, where the first software component was included in the first version at the first time, wherein (i) the hierarchy of versions includes a second version higher than the first version in the hierarchy and the first version is configured to inherit properties of the second version and (ii) accessing a data structure includes accessing a first entry of the data structure, the first entry specifying a second time and specifying whether the first software component was included, at the second time, in the first view or in a second view of another version of the software development project from which the first version inherits properties; and (B) if it is determined that the first software component was included in the first view at the first time, displaying the first software component in a display of the subset of software components in the first version, and displaying the first software component in the display if the first entry specifies that the first software component was included in the first or second view at the second time, wherein the data structure comprises a first entry specifying a first time and at least one first instruction specifying whether a first software component of a first version was to be displayed in a listing of contents of the first version at the first time, where the first software component was included in the first version at the first time, wherein the data structure further comprises at least a second entry specifying a second time different than the first time and a second version from which the first version inherits properties and specifying whether the first software component of the first version was included in the view of the second version at the second time, and wherein the software configuration management application determines whether to execute a display process to display to a user information regarding the first software component in a display of a subset of software components of the first version based at least in part on the data structure.

15. The computer-readable medium of claim 14, wherein the first entry comprises:

an element identifier specifying the first software component;

a version identifier specifying the first version;

a time-based identifier representing the first time; and an inclusion/exclusion indicator specifying whether the first software component was included in the view of the first version at the first time.

16. The computer-readable medium of claim 14, wherein the first software component is a file.

17. The computer-readable medium of claim 14, wherein the first software component is a directory of files.

18. The computer-readable medium of claim 14, wherein the first version is a workspace of a user.

19. The computer-readable medium of claim 14, wherein the hierarchy includes a second version of the software development project configured to inherit properties of the first version, the data structure further comprising:

a second entry specifying a second time and specifying whether the first software component was included in the view of the second version at the second time.

20. A system for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the system enabling recreation of a previous display of a subset of software components of a first version of the software development project by determining software components that were included in a first view of the first version at a first time, wherein the hierarchy includes a second version higher than the first version in the hierarchy and where the first version is configured to inherit properties of the second version, the system comprising at least one processor to perform the acts of:

a stream view engine to access a data structure that represents a history of views of versions of the software development project included in the hierarchy to determine at least one instruction that defines at least in part a first associated subset associated with the first view by specifying whether a first software component was to be displayed in a listing of contents of the first version at the first time, where the first software component was included in the first version at the first time, wherein the stream view engine accesses a first entry of the data structure, the first entry specifying a second time and specifying whether the first software component was included, at the second time, in the first view or in a second view of another version of the software development project from which the first version inherits properties; and a user interface to recreate the previous display by including the first software component in a display of a subset of software components of the first version if it is determined that the first software component was included in the first view at the first time, wherein the first software component is displayed in the display if the first entry specifies that the first software component was included in the first or second view at the second time.

21. The system of claim 20, further comprising:

the data structure that represents a history of views or versions of the software development project included in the hierarchy.

22. A system for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the system enabling recreation of a previous display of a subset of software components of a first version of the software development project by determining software components that were included in a first view of the first version at a first time, wherein the hierarchy includes a second version higher than the first version in the hierarchy and where the first version is configured to inherit properties of the second version, the system comprising at least one processor to perform the acts of:

a means to accessing a data structure that represents a history of views of versions of the software development project included in the hierarchy to determine at least one instruction that defines at least in part a first associated subset associated with the first view by specifying whether a first software component was to be displayed in a listing of contents of the first version at the first time, where the first software component was included in the first version at the first time, wherein the means accesses a first entry of the data structure, the first entry specifying a second time and specifying whether the first software component was included, at the second time, in the first view or in a second view of another version of the software development project from which the first version inherits properties; and a user interface to recreate the previous display by including the first software component in a display of a subset of software components of the first version if it is determined that the first software component was included in the first view at the first time, wherein the first software component is displayed in the display if the first entry specifies that the first software component was included in the first or second view at the second time.

23. For use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, a computer-readable storage medium having computer-readable signals stored thereon that define instructions that, as a result of being executed by a computer, control the computer to perform a method for enabling recreation of a previous display of a subset of software components of a first version of the software development project by determining software components that were included in a first view of the first version at a first time, wherein the hierarchy includes a second version higher than the first version in the hierarchy and where the first version is configured to inherit properties of the second version, the method comprising acts of:

(A) accessing a data structure stored in a computer-readable storage device, the data structure containing data that represents a history of views of versions of the software development project included in the hierarchy, to determine at least one instruction that defines at least in part a first associated subset associated with the first view by specifying whether a first software component was to be displayed in a listing of contents of the first version at the first time, where the first software component was included in the first version at the first time, wherein the accessing comprises accessing a first entry of the data structure, the first entry specifying a second time and specifying whether the first software component was included, at the second time, in the first view or in a second view of another version of the software development project from which the first version inherits properties; and (B) if it is determined that the first software component was included in the first view at the first time, recreating the previous display by displaying the first software component in a display of a subset of software components of the first version, wherein the first software component is displayed in the display if the first entry specifies that the first software component was included in the first or second view at the second time.

24. A method for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the method enabling recreation of a previous display of a subset of software components of a first version of the software development project by recording an instruction indicating whether to include a first software component in a view of a first version of the software development project, wherein the hierarchy includes a second version higher than the first version in the hierarchy and where the first version is configured to inherit properties of the second version, the method comprising acts of:

(A) receiving the instruction at a first time; and
(B) using a processor, (i) recording an entry in a computer-readable data structure that represents a history of views of versions of the software development project included in the hierarchy, the entry specifying the instruction and the first time at which the instruction was received, the instruction specifying whether a first software component was to be displayed in a listing of contents of the first version and another version that inherits properties from the first version at the first time, where the first software component was included in the first version at the first time, (ii) accessing a first entry of the data structure, the first entry specifying a second time and specifying whether the first software component was included, at the second time, in the first view or in a second view of another version of the software development project from which the first version inherits properties, and (iii) effecting display of the first software component in a display if the first entry specifies that the first software component was included in the first or second view at the second time.

25. The method of claim 24, wherein the entry comprises:
an element identifier specifying the first software component;
a version identifier specifying the first version;
a time-based identifier representing the particular time; and
an inclusion/exclusion indicator specifying whether the software component is included in the view of the first version at the first time, based on the received instruction.

26. The method of claim 24, wherein the first software component is a file.

27. The method of claim 24, wherein the first software component is a file directory.

28. The method of claim 24, wherein the first version is a workspace of a user.

29. A system for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the system enabling recreation of a previous display of a subset of software components of a first version of the software development project by recording an instruction indicating whether to include a first software component in a view of a first version of the software development project, wherein the hierarchy includes a second version higher than the first version in the hierarchy and where the first version is configured to inherit properties of the second version, the system comprising at least one processor to perform the acts of:
a user interface to receive the instruction at a first time; and
a stream view engine to record an entry in a data structure that represents a history of views of versions of the software development project included in the hierarchy, the entry specifying the instruction and the first time at which the instruction was received, the instruction specifying whether a first software component was to be displayed in a listing of contents of the first version and another version that inherits properties from the first version at the first time, where the first software component was included in the first version at the first time, such that upon accessing a first entry of the data structure, the first entry specifying a second time and specifying whether the first software component was included, at the second time, in the first view or in a second view of another version of the software development project from which the first version inherits properties, the first software component is displayed if the first entry specifies that the first software component was included in the first or second view at the second time.

30. The system of claim 29, further comprising:
the data structure that represents a history of view of versions of the software development project included in the hierarchy.

31. A system for use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, the system enabling recreation of a previous display of a subset of software components of a first version of the software development project by recording an instruction indicating whether to include a first software component in a view of a first version of the software development project, wherein the hierarchy includes a second version higher than the first version in the hierarchy and where the first version is configured to inherit properties of the second version, the system comprising at least one processor to perform the acts of:
a user interface to receive the instruction at a first time; and
means for recording an entry in a data structure that represents a history of views of versions of the software development project included in the hierarchy, the entry specifying the instruction and the first time at which the instruction was received, the instruction specifying whether a first software component was to be displayed in a listing of contents of the first version and another version that inherits properties from the first version at the first time, where the first software component was included in the first version at the first time, such that upon accessing a first entry of the data structure, the first entry specifying a second time and specifying whether the first software component was included, at the second time, in the first view or in a second view of another version of the software development project from which the first version inherits properties, the first software component is displayed if the first entry specifies that the first software component was included in the first or second view at the second time.

32. For use in conjunction with a configuration management software application to manage a software development project represented by a hierarchy of versions of the software development project, where each version comprises a set of software components and the configuration management software application supports creation of views of a version to display subsets of the software components of the version, each view defining, at a particular time, an associated subset of software components included in the view such that modifications of definitions of the view over time result in modifications of the associated subset, a computer-readable storage medium having computer-readable signals stored thereon that define instructions that, as a result of being executed by a computer, control the computer to perform a method enabling recreation of a previous display of a subset of software components of a first version of the software development project by recording an instruction indicating whether to include a first software component in a view of a first version of the software development project, wherein the hierarchy includes a second version higher than the first version in the hierarchy and where the first version is configured to inherit properties of the second version, the method comprising acts of:

(A) receiving the instruction at a first time; and (B) using a processor, (i) recording an entry in a computer-readable data structure that represents a history of views of versions of the software development project included in the hierarchy, the entry specifying the instruction and the first time at which the instruction was received, the instruction specifying whether a first software component was to be displayed in a listing of contents of the first version and another version that inherits properties from the first version at the first time, where the first software component was included in the first version at the first time, (ii) accessing a first entry of the data structure, the first entry specifying a second time and specifying whether the first software component was included, at the second time, in the first view or in a second view of another version of the software development project from which the first version inherits properties, and (iii) effecting display of the first software component in a display if the first entry specifies that the first software component was included in the first or second view at the second time.

* * * * *